US011221537B2

(12) United States Patent
Stanley et al.

(10) Patent No.: US 11,221,537 B2
(45) Date of Patent: Jan. 11, 2022

(54) SWITCHABLE DEVICE

(71) Applicant: Pilkington Group Limited, Lathom (GB)

(72) Inventors: Andrew Thomas Stanley, Lathom (GB); Jonathan Barclay Dixon, Lathom (GB); Jonathan Peter Voss, Croston (GB)

(73) Assignee: PILKINGTON GROUP LIMITED, Lancashire (GB)

( * ) Notice: Subject to any disclaimer, the term of this patent is extended or adjusted under 35 U.S.C. 154(b) by 0 days.

(21) Appl. No.: 15/540,434

(22) PCT Filed: Dec. 22, 2015

(86) PCT No.: PCT/GB2015/054135
§ 371 (c)(1),
(2) Date: Jun. 28, 2017

(87) PCT Pub. No.: WO2016/108043
PCT Pub. Date: Jul. 7, 2016

(65) Prior Publication Data
US 2018/0004062 A1    Jan. 4, 2018

(30) Foreign Application Priority Data

Dec. 29, 2014 (GB) ..................................... 1423311

(51) Int. Cl.
*G02F 1/17* (2019.01)
*G02F 1/139* (2006.01)
(Continued)

(52) U.S. Cl.
CPC ................ *G02F 1/172* (2013.01); *B60J 3/04* (2013.01); *E06B 3/6722* (2013.01); *E06B 9/24* (2013.01);
(Continued)

(58) Field of Classification Search
CPC .... G02F 1/0121; G02F 1/0305; G02F 1/0311; G02F 1/0316; G02F 1/13; G02F 1/1323;
(Continued)

(56) References Cited

U.S. PATENT DOCUMENTS 4,832,468 A * 5/1989 Ito ........................... G02F 1/163
359/275
5,402,144 A * 3/1995 Ripoche .................. G02F 1/163
345/105

(Continued)

FOREIGN PATENT DOCUMENTS

| CN | 102209831 A | 10/2011 |
| JP | H06-180563 A | 6/1994 |

(Continued)

OTHER PUBLICATIONS

* International Search Report (PCT/ISA/210) dated Mar. 22, 2016, by the British Patent Office as the International Searching Authority for International Application No. PCT/GB2015/054135.

(Continued)

*Primary Examiner* — Nicholas R. Pasko
(74) *Attorney, Agent, or Firm* — Buchanan Ingersoll & Rooney PC

(57) ABSTRACT

A switchable device for changing the opacity of at least a portion of a glazing is described. The switchable device comprises at least two (a first and a second) switchable regions in electrical communication with at least two (a first and a second) electrical connector regions. Each switchable region comprises an electrically actuated variable opacity layer between a first electrode and a second electrode, the first switchable region being arranged relative to the second switchable region such that upon connecting the first and second electrical connector regions to a suitable power supply, the opacity of the first and second switchable region changes such that at least two (a first and a second) portions (Continued)

of the switchable device have a change of opacity, the first portion of the switchable device having a different opacity to the second portion of the switchable device.

20 Claims, 16 Drawing Sheets

(51) Int. Cl.
*B60J 3/04* (2006.01)
*E06B 9/24* (2006.01)
*E06B 3/67* (2006.01)

(52) U.S. Cl.
CPC ...... *G02F 1/139* (2013.01); *E06B 2009/2464* (2013.01); *G02F 2201/12* (2013.01)

(58) Field of Classification Search
CPC ............ G02F 1/1343; G02F 1/134309; G02F 1/134327; G02F 1/134336; G02F 1/1345; G02F 1/13452; G02F 1/13454; G02F 1/13336; G02F 1/136227; G02F 1/155; G02F 1/163; G02F 1/1676; G02F 1/16761; G02F 1/16762; G02F 2001/134318; G02F 2001/1357; G02F 2001/1552; G02F 2001/1555; G02F 2001/1557; G02F 2201/44; B60J 3/04; B32B 17/10513; B32B 17/10532
USPC .............. 359/245–275; 349/46–47, 143–151
See application file for complete search history.

(56) References Cited

U.S. PATENT DOCUMENTS

| | | | |
|---|---|---|---|
| 6,795,226 B2 * | 9/2004 | Agrawal | B32B 17/10513 |
| | | | 359/265 |
| 7,450,291 B2 * | 11/2008 | Guarr | G02F 1/153 |
| | | | 359/265 |
| 7,800,812 B2 | 9/2010 | Moskowitz | |
| 7,876,399 B2 * | 1/2011 | Seelhammer | G02F 1/134309 |
| | | | 349/69 |
| 8,004,739 B2 * | 8/2011 | Letocart | G02F 1/163 |
| | | | 359/265 |
| 8,098,421 B2 | 1/2012 | Moskowitz | |
| 8,120,839 B2 | 2/2012 | Moskowitz | |
| 8,792,154 B2 | 7/2014 | Moskowitz | |
| 2003/0227663 A1 | 12/2003 | Agrawal et al. | |
| 2011/0170030 A1 * | 7/2011 | Boote | E06B 9/24 |
| | | | 349/41 |
| 2013/0057939 A1 * | 3/2013 | Yeh | G02F 1/155 |
| | | | 359/265 |
| 2013/0201549 A1 | 8/2013 | Mori et al. | |
| 2014/0177028 A1 * | 6/2014 | Shrivastava | E06B 9/24 |
| | | | 359/275 |

FOREIGN PATENT DOCUMENTS

| | | |
|---|---|---|
| JP | 2010-049254 A | 3/2010 |
| KR | 10-2010-0022437 A | 3/2010 |
| WO | WO 2004/077649 A2 | 9/2004 |
| WO | 2006/078546 A2 | 7/2006 |
| WO | WO 2006/078564 A1 | 7/2006 |
| WO | WO 2007/010542 A1 | 1/2007 |
| WO | WO 2007/029215 A2 | 3/2007 |
| WO | WO 2010/032069 A1 | 3/2010 |
| WO | WO 01/01191 A1 | 1/2011 |

OTHER PUBLICATIONS

Beevor, "Smart Building Envelopes," 4th Year Project Report, University of Cambridge Department of Engineering, (Jun. 2010), (50 pages).

LC and SPD SmartGlass, Electronically Switchable Glass Handbook, SmartGlass International Ltd 2009, (55 pages).

The Use of SPD-Smart, Light-Control Film Technology in Automotive Smart Windows and Roof Systems, Plastics in Automotive Glazing Conference—Jun. 27, 2007, (34 pages).

Office Action (Notification of the First Office Action) dated Dec. 30, 2019, by the China National Intellectual Property Administration in corresponding Chinese Patent Application No. 201580071248.X and an English Translation of the Office Action. (16 pages).

Office Action (Notice of Reasons for Refusal) dated Jan. 7, 2020, by the Japanese Patent Office in corresponding Japanese Patent Application No. 2017-531723 and an English Translation of the Office Action. (8 pages).

* cited by examiner

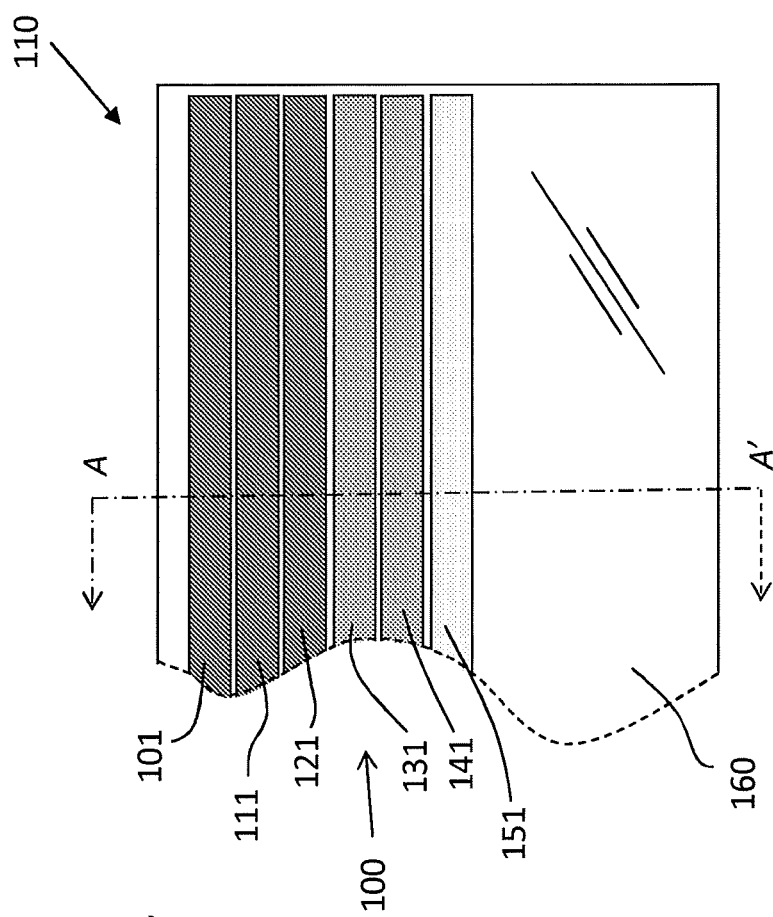
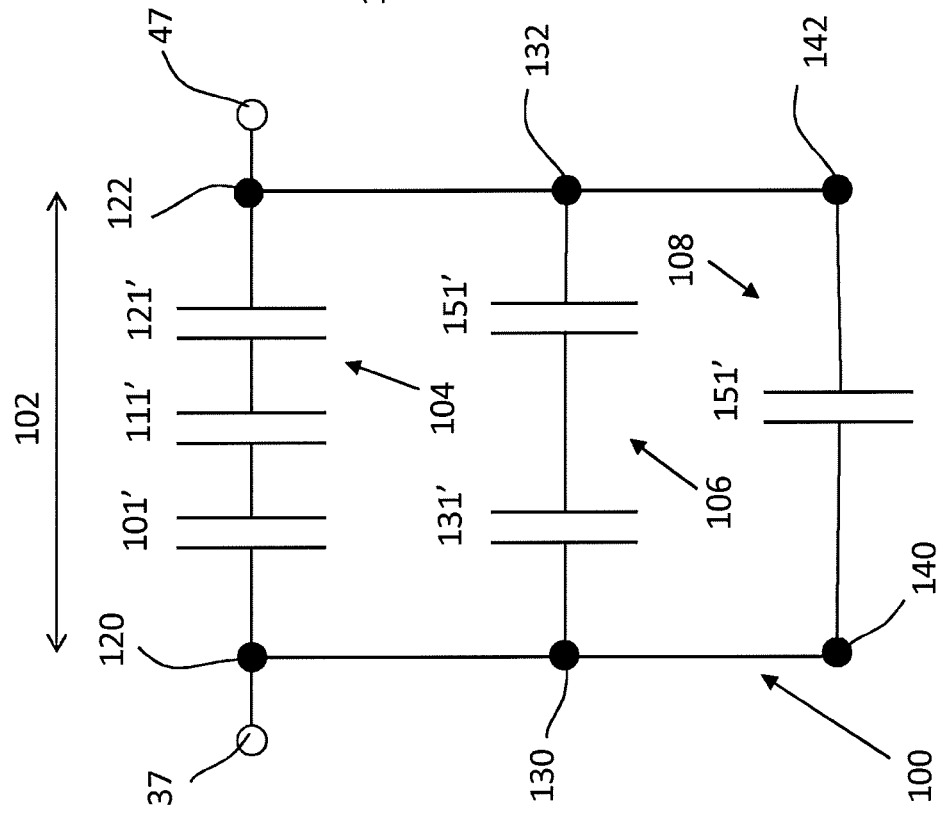
Fig. 13
Fig. 12

SWITCHABLE DEVICE

The present invention relates to a switchable device for changing the opacity of at least a portion of a glazing, in particular a switchable device comprising a plurality of switchable regions for use as a shade band in a vehicle glazing.

It is known that automotive vehicles such as cars have a laminated windscreen. Sometimes the upper portion of the windscreen has a tinted region often referred to as a shade band. In a conventional windscreen comprising a pair of soda-lime-silica glass sheets bonded together by a layer of polyvinyl butyral (PVB), the shade band is usually a tinted region of the PVB and as such once the windscreen has been manufactured, the shade band is fixed in position. As a result, the optimum position of the shade band is often not achieved because the position of the sun in the sky changes over the course of a day. Furthermore in instances where the shade band is not required, it is not possible to increase the overall transmission through the windscreen because of the fixed tinted region of PVB.

One solution has been proposed in WO2010/032069A1 to use a film comprising a suspended particle device (an SPD film) as a shade band. An SPD film is switched using a high frequency voltage to produce a region of variable transmission in the SPD film.

Such a method requires a high frequency power supply that increases series impedance due to the inductance of transmission lines, with the potential to make power transmission to the SPD film difficult.

It is known from WO2004/077649A2 to power individual SPD films using a capacitor network to apply a particular magnitude alternating voltage across each SPD film. Such a system requires a separate capacitor network to switch the SPD films.

SPD film control systems are also described in WO2006/078564A2, WO2007/029215A2 and WO2007/010542A1.

US2013/0201549A1 describes a suspended particle device including a first substrate; a second substrate; a first electrode that can be controlled for a potential; a second electrode that can be controlled for a potential different from that of the first electrode; an electrified body; and a liquid suspension containing charged light control particles and a dispersion medium, in which the first electrode, the second electrode and the electrified body are disposed between the first substrate and the second substrate, and the liquid suspension is sealed between the first substrate and the second substrate, and the light control particles are capable of being accumulated to a periphery of the electrified body.

WO01/01191A1 describes a window with adjustable transparency.

The present inventors have found that it is possible to utilise the capacitive effects of switchable films to provide a switchable device for changing the opacity of at least a portion of a glazing.

Accordingly the present invention provides a switchable device for changing the opacity of at least a portion of a glazing, the switchable device comprising at least two (a first and a second) switchable regions in electrical communication with at least two (a first and a second) electrical connector regions, each switchable region comprising an electrically actuated variable opacity layer between a first electrode and a second electrode, the first switchable region being arranged relative to the second switchable region such that upon connecting the first and second electrical connector regions to a suitable power supply, the opacity of the first and second switchable regions changes such that at least two (a first and a second) portions of the switchable device have a change of opacity, the first portion of the switchable device having a different opacity to the second portion of the switchable device.

A switchable device according to the present invention may utilise only a pair of electrical regions to change the opacity of two physically separate switchable regions. Also, a switchable device according to the present invention is able to utilise a low frequency power supply to achieve the desired switching behaviour.

In a preferred embodiment the switchable device comprises only a single pair of electrical connector regions (the first electrical connector region and the second electrical connector region) configured for connection to the suitable power supply.

Suitably the first and second electrodes of the first and/or second switchable regions are planar electrodes.

The opacity of the first switchable region is a function of the voltage applied across the first and second electrodes of the first switchable region. For a suitably high voltage, the opacity of the electrically actuated variable opacity layer between first and second electrodes of the first switchable region changes from high to low i.e. the opacity decreases and more visible light can pass through the first switchable region. Typically when no voltage is applied across the first and second electrodes of the first switchable region, the opacity of the electrically actuated variable opacity layer between the first and second electrodes of the first switchable region is greatest i.e. the first switchable region has the lowest transmission of visible light and is often referred to as being "switched off". It is preferred that when no voltage is applied across the first and second electrodes of the first switchable region, the opacity of the electrically actuated variable opacity layer between the first and second electrodes of the first switchable region is greatest i.e. the first switchable region has the lowest transmission of visible light, and upon applying a suitably high voltage at a suitable frequency across the first and second electrodes of the first switchable region, the opacity of the electrically actuated variable opacity layer between first and second electrodes of the first switchable region decreases i.e. the opacity is lower compared to when no voltage is applied across the first and second electrodes of the first switchable region.

The opacity of the second switchable region is a function of the voltage applied across the first and second electrodes of the second switchable region. For a suitably high voltage, the opacity of the electrically actuated variable opacity layer between first and second electrodes of the second switchable region changes from high to low i.e. the opacity decreases and more visible light can pass through the first switchable region. Typically when no voltage is applied across the first and second electrodes of the second switchable region, the opacity of the electrically actuated variable opacity layer between the first and second electrodes of the second switchable region is greatest i.e. the second switchable region has the lowest transmission of visible light. It is preferred that when no voltage is applied across the first and second electrodes of the second switchable region, the opacity of the electrically actuated variable opacity layer between the first and second electrodes of the second switchable region is greatest i.e. the second switchable region has the lowest transmission of visible light, and upon applying a suitably high voltage at a suitable frequency across the first and second electrodes of the second switchable region, the opacity of the electrically actuated variable opacity layer between first and second electrodes of the second switchable region decreases i.e. the opacity is lower compared to when no voltage is applied across the first and second electrodes of the second switchable region.

Since the first and second electrodes of each switchable region are spaced apart, each switchable region behaves like a parallel plate capacitor and has an associated capacitance. As such, the switchable regions may be electrically connected in series and/or in parallel as if each switchable region was a capacitor.

The capacitance of a particular switchable region may be varied by choosing an appropriate major surface area for the electrodes, especially when the electrodes are planar electrode. Alternatively the separation of the electrodes may be selected, especially when the electrodes are planar electrodes. Alternatively the dielectric constant of the electrically actuated variable opacity layer in between the electrodes may be altered, especially when the electrodes are planar electrodes.

Preferably the first switchable region has a first capacitance and the second switchable region has a second capacitance different to the first capacitance.

Preferably the first switchable region has a first capacitance and the second switchable region has a second capacitance the same as the first capacitance.

In some embodiments the capacitance of each of all the at least two switchable regions are different.

Preferably the first electrode of the first and second switchable regions has a major surface, and the area of the major surface of the first electrode of the first switchable region is different to the area of the major surface of the first electrode of the second switchable region.

Preferably the first electrical connector region is in electrical communication with the first electrode of the first switchable region, and the second electrode of the first switchable region is in electrical communication with the first electrode of the second switchable region, and the second electrode of the second switchable region is in electrical communication with the second electrical connector region.

Preferably there is a direct galvanic connection between the second electrode of the first switchable region and the first electrode of the second switchable region.

Preferably there is a direct galvanic connection between the first electrical connector region and the first electrode of the first switchable region.

Preferably there is a direct galvanic connection between the second electrode of the second switchable region and the second electrical connector region.

In some embodiments the first switchable region has a first capacitance and the second switchable region has a second capacitance the same or different to the first capacitance, further wherein the switchable device comprises a third switchable region such that the switchable device comprises at least three switchable regions in electrical communication with the first and second electrical connector regions, the third switchable region comprising an electrically actuated variable opacity layer between a first electrode and a second electrode, the third switchable region having a third capacitance, wherein upon connecting the first and second electrical connector regions to a suitable power supply, the opacity of the first, second and third switchable regions changes such that at least three (a first, a second and a third) portions of the switchable device have a change of opacity, the third portion of the switchable device having a different opacity to the opacity of the first and second portions.

Embodiments where the switchable device comprises a third switchable region comprising an electrically actuated variable opacity layer between a first electrode and a second electrode have other preferable features.

Preferably the first capacitance is the same as the second capacitance, further wherein the opacity of the first portion is the same as the opacity of the second.

Preferably the third capacitance is the same as the first and second capacitance.

Preferably the first electrode of the first switchable region is in electrical communication with the first electrical connector region, the first electrode of the second switchable region is in electrical communication with the first electrical connector region and the first electrode of the first switchable region, the second electrode of the first switchable region is in electrical communication with the second electrode of the second switchable region, the first electrode of the third switchable region is in electrical communication with the second electrode of the first switchable region and the second electrode of the second switchable region, and the second electrode of the third switchable region is in electrical communication with the second electrical connector region.

Preferably the first electrode of the first switchable region and/or the first electrode of second switchable region is in direct electrical communication with the first electrical connector region.

Preferably the first electrode of the second switchable region is in direct electrical communication with the first electrode of the first switchable region.

Preferably the second electrode of the first switchable region is in direct electrical communication with the second electrode of the second switchable region.

Preferably the first electrode of the third switchable region is in direct electrical communication with the second electrode of the first switchable region.

Preferably the first electrode of the third switchable region is in direct electrical communication with the second electrode of the second switchable region.

Preferably the second electrode of the third switchable region is in direct electrical communication with the second electrical connector region.

In embodiments where there is a third switchable region, preferably the first electrode of the first switchable region is in electrical communication with the first electrical connector region, the first electrode of the second switchable region is in electrical communication with the first electrical connector region, the first electrode of the first switchable region is in electrical communication with the first electrode of the second switchable region, the second electrode of the first switchable region is in electrical communication with the first electrode of the third switchable region, the second electrode of the third switchable region is in electrical communication with the second electrode of the second switchable region, the second electrode of the second switchable region is in electrical communication with the second electrical connector region, and the second electrode of the third switchable region is in electrical communication with the second electrical connector region.

Preferably the first electrode of the first switchable region and/or the first electrode of the second switchable region is in direct electrical communication with the first electrical connector region.

Preferably the first electrode of the first switchable region is in direct electrical communication with the first electrode of the second switchable region.

Preferably the second electrode of the first switchable region is in direct electrical communication with the first electrode of the third switchable region.

Preferably the second electrode of the third switchable region is in direct electrical communication with the second electrode of the second switchable region.

Preferably the second electrode of the second switchable region is in direct electrical communication with the second electrical connector region.

Preferably the second electrode of the third switchable region is in direct electrical communication with the second electrical connector region.

In a general sense it is possible to define the switchable device according to the present invention in terms of a number of branches electrically connected in series and in electrical communication with the first and second electrical connector regions. In general the switchable device has B branches. Each branch B has a total of R switchable regions in electrical communication with two nodes N and M, there being one node at each end of the respective branch. Node N is in electrical communication with the first electrical connector region and node M is in electrical communication with the second electrical connector region. Each node may be an imaginary point along a path electrically connecting the respective node to the respective electrical connector region.

Within each branch B there are I arms, each arm being in electrical communication with the nodes N, M of the respective branch. As such, the I arms in each branch are electrically connected in parallel.

Each individual arm I has s switchable regions connected in series and p switchable regions connected in parallel. As such, the total number of switchable regions in an arm is s+p. Given that a branch has I arms, R can be written as:

$$R = \sum_{i=1}^{I} s_i + p_i \quad (1)$$

The total number of switchable regions $S_T$ of the switchable device is therefore given by:

$$S_T = \sum_{j=1}^{B} R_j \quad (2)$$

Hence the total number of switchable regions in the switchable device may be represented as:

$$S_T = \sum_{j=1}^{B} \left( \sum_{i=1}^{I} s_i + p_i \right) \quad (3)$$

A particular branch j having i arms can be denoted by:

$$B_j = \sum_{i=1}^{I} I_i^{B_j} \quad (4)$$

To identify each switchable region, in the jth branch B the ith arm I can be denoted by:

$$I_i^{B_j} = \sum_{1}^{k} {}^{B_j}s_k^{I_i} + \sum_{1}^{m} {}^{B_j}p_m^{I_i} \quad (5)$$

The switchable device may therefore be represented as $$S_D = \sum_{j=1}^{B} B_j = \sum_{j=1}^{B} \sum_{i=1}^{I} I_i^{B_j} \quad (6)$$

where $I_i^{B_j}$ The ith arm I in the jth branch B (7)

${}^{B_j}s_k^{I_i}$ The kth switchable region s connected in series in the ith arm I of the jth branch B (8)

${}^{B_j}p_m^{I_i}$ The mth switchable region p connected in parallel in the ith arm I of the jth branch B (9)

In the simplest embodiment of the present invention, the switchable device comprises only two switchable regions connected electrically in series, wherein the first switchable region has a first capacitance and the second switchable region has a second capacitance different to the first capacitance. In terms of the above equations (1) to (9), in this embodiment B=1, I=1, R=s=2 and p=0. In accordance with equation (7) the arm in this configuration can be represented as $I_1^1$ and in accordance with equation (8) the two switchable regions electrically connected in series can be represented as ${}^1s_1^1$ and ${}^1s_2^1$. In accordance with equation (6) the switchable device may be represented as $S_D = {}^1s_1^1 + {}^1s_2^1$ where ${}^1s_1^1 \neq {}^1s_2^1$.

In some embodiments, B=1.

In some embodiments, B=1, I=1, s>2 and p=0.

In embodiments where B=1, I=1 and p=0, the opacity of each switchable region is determined primarily by the capacitance of the switchable region itself. If it is desired to not use any external capacitors, the size of the switchable region can be altered to change the capacitance thereof. Other factors can be varied to alter the capacitance of the switchable regions, for example, for a particular switchable region the spacing of the first and second electrodes may be altered, particularly when the first and second electrodes are planar electrodes. Alternatively, the dielectric constant of the layer between the electrodes may be changed.

In a given branch having two or more arms, to create two or more different opacity regions it is preferred to have a different number of switchable regions in each arm, each switchable region in the respective arm having the same, or substantially the same capacitance.

In embodiments when B>=1 and I>=2, each arm may have a different number of switchable regions.

In embodiments where I>=2, the switchable device may be arranged such that in sequence the arms have progressively more or progressively less switchable regions than the previous arm such that graded opacity is produced. The first arm may have only one switchable region and subsequent arms each have a progressively increasing number of switchable regions.

The number of switchable regions in an arm may be selected to provide a desired opacity. For example, for a branch having two or more arms, in an arm where p=0 and s=1 then for a given input voltage across the electrodes the switchable region is able to fully switch to have the lowest level of opacity i.e $O_{min}$. For an arm where it is desired to have an opacity of $2 \times O_{min}$, by reference to a voltage/opacity graph for the switchable region it is possible to determine a voltage that is required across the planar electrodes to achieve the desired level of opacity. If an input voltage $V_{max}$ produces an opacity $O_{min}$, then to get an opacity of $2 \times O_{min}$ may require an input voltage of around $\frac{1}{2} V_{max}$. Assuming equal capacitance regions, an arm having two switchable regions of the same capacitance provides the desired opacity i.e. $2 \times O_{min}$ for an input voltage of $V_{max}$. The opacity of the switchable regions in an arm can be further effected by having different capacitances.

The number of branches B, arms I and switchable regions s, p may be selected for a particular application.

In practice it may be difficult to have switchable regions having a narrow width so it may be necessary to construct a number of switchable regions on a single film, and to then cut the film in such a way as to provide the switchable regions.

In some embodiments, B=1, I=2, arm $I_1^1$ has s=2 and p=0 and arm $I_2^1$ has s=1 and p=0.

In some embodiments, B=2 and in branch $B_1$ there are two arms (I=2) where arm $I_1^1$ has s=1 and p=0 and arm $I_2^1$ has s=1 and p=0 and in branch $B_2$ there is one arm (I=1) where in arm $I_1^2$ s=1 and p=0.

In some embodiments, B>=1, I>=2, $I_1^1$ has s>=2 and p>=0 and $I_2^1$ has s=>1 and p>=0.

In some embodiments, B>=2 where in $B_1$ there are two or more arms and $I_1^1$ has s>=1 and p>=0 and arm $I_2^1$ has s>=1 and p>=0 and wherein in $B_2$ there is one or more arms each having s>=1 and p>=0.

In some embodiments, B>=1 and in branch $B_1$ there are three or more arms wherein in arm $I_1^1$ s>=z and p>=0, in arm $I_2^1$ s>=(z-1) and p>=0 and in arm $I_3^1$ s>=z-2, z being at least three.

In some embodiments B>=1 wherein in branch $B_1$ there are three or more arms and wherein in arm $I_1^1$ s=1 and p>=0, in arm $I_2^1$ s>=2 and p>=0 and in arm $I_3^1$ s>=3.

In some embodiments the voltage across each pair of electrodes of each respective switchable region is determined primarily or only by the capacitance of the switchable regions.

In some embodiments at least one of the switchable regions comprises a suspended particle device or a liquid crystal. Preferably all of the switchable regions comprises a suspended particle device or a liquid crystal.

In a preferred embodiment the opacity of the first and second switchable portions is changeable by connecting the suitable power supply to only the first and second electrical connector regions.

In some embodiments the suitable power supply may be a variable power supply, such that the magnitude of the output voltage is variable and/or the frequency of the output voltage is variable. Suitably the power supply is operable in a frequency range of 10 Hz to 500 Hz.

In some embodiments the first electrical connector region is configured to be connected to a first external connector region and/or the second electrical connector region is configured to be connected to a second external connector region, the first and/or second external connector regions configured to be in electrical communication with the suitable power supply. For example, the first external connector region may be a connector that engages with the first electrical connector region by a clip action or a socket/plug fit action.

A switchable device according to the present invention may be incorporated in a glazing, the glazing comprising at least one (a first) sheet of glazing material and a switchable glazing device according to the present invention, wherein the switchable device is arranged to face a major surface of the sheet of glazing material such that upon connecting the first and second electrical connector regions, the two portions of the switchable device provide the glazing with at least two regions of different opacity when viewed in the direction of the major surface of the sheet of glazing material.

Preferably the first sheet of glazing material comprises at least one sheet of glass, more preferably soda-lime-silica glass.

Preferably the switchable device is positioned between the first sheet of glazing material and a second sheet of glazing material. Preferably there is at least one cavity between the first sheet of glazing material and the second sheet of glazing material and the switchable device is positioned in the cavity.

Preferably the switchable device is bonded to the major surface of the first sheet of glazing material by an interlayer structure comprising at least one sheet of adhesive interlayer material. Suitable adhesive interlayers are polyvinyl butyral, ethylene vinyl acetate copolymer, polyurethane, poly vinyl chloride and copolymers of ethylene and methacrylic acid. Preferably a second sheet of glazing material is joined to the first sheet of glazing material by the interlayer structure.

Preferably the glazing is part of a window for a vehicle or a window for a building.

When part of a glazing, the first and/or second electrical connector regions may be physically separate from the first sheet of glazing material. For example, the first and/or second electrical connector regions may comprise wires, the ends of which are connectable to a suitable power supply.

Embodiments of the present invention will now be described by way of example only with reference to the following figures (not to scale) in which:

FIG. 12 shows a circuit diagram representing the switchable device shown in FIG. 9;

FIG. 13 shows a plan view of a portion of a glazing incorporating the switchable device shown in FIG. 11;

Figure 1:
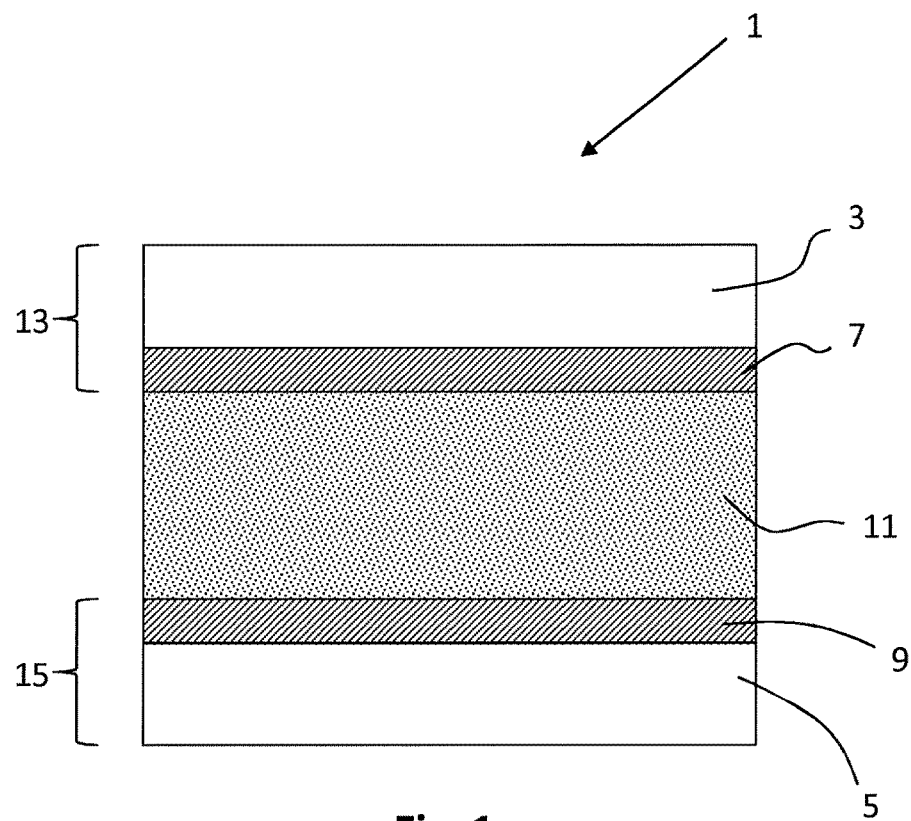
FIG. 1 show a cross-sectional view of a suspended particle device film.

FIG. 1 shows a cross-sectional view of a suspended particle device (SPD) film 1. The SPD film 1 comprises a first sheet of polyethylene terephthalate (PET) 3 and a second sheet of PET 5. On one major surface of the PET sheet 3 is an electrically conductive coating of indium tin oxide (ITO) 7. On one major surface of the PET sheet 5 is an electrically conductive coating of ITO 9. Each ITO coating 7, 9 is coextensive with the major surface of the respective PET sheet 3, 5.

The SPD film 1 comprises a plurality of particles suspended within a liquid suspension medium, which are held within layer 11. The layer 11 is typically a polymer medium. The layer 11 is in contact with and adhered to the ITO coatings 7, 9.

The coating of ITO 7 on the PET sheet 3 is a first planar electrode 13. The coating of ITO 9 on the PET sheet 5 is a second planar electrode 15.

An electric field may be applied across the layer 11 by suitably connecting the ITO coating 7, 9 of respective planar electrodes 13, 15 to a suitable power supply. This may be achieved by a direct galvanic connection to the ITO coating, for example a first busbar may have a direct galvanic connection with the ITO coating 7 and another busbar (i.e. a second busbar) may have a direct galvanic connection with the ITO coating 9.

It is also known to use a remote electrical connection to capacitively couple to the ITO coating, see WO2010/032070A1.

Whether the electrical connection to the respective ITO coating is direct galvanic or remote (or a combination thereof), by bringing the ITO coatings 7, 9 into electrical communication with a suitable power supply (for example a sinusoidally varying voltage at 120V rms and a frequency of 50 Hz) the opacity of the layer 11 changes.

In an alternative construction, the SPD film may have the orientation of the planar electrode 13 and/or planar electrode 15 reversed such that the PET sheet of the respective electrode is between the respective ITO coating and layer 11.

Figure 23:
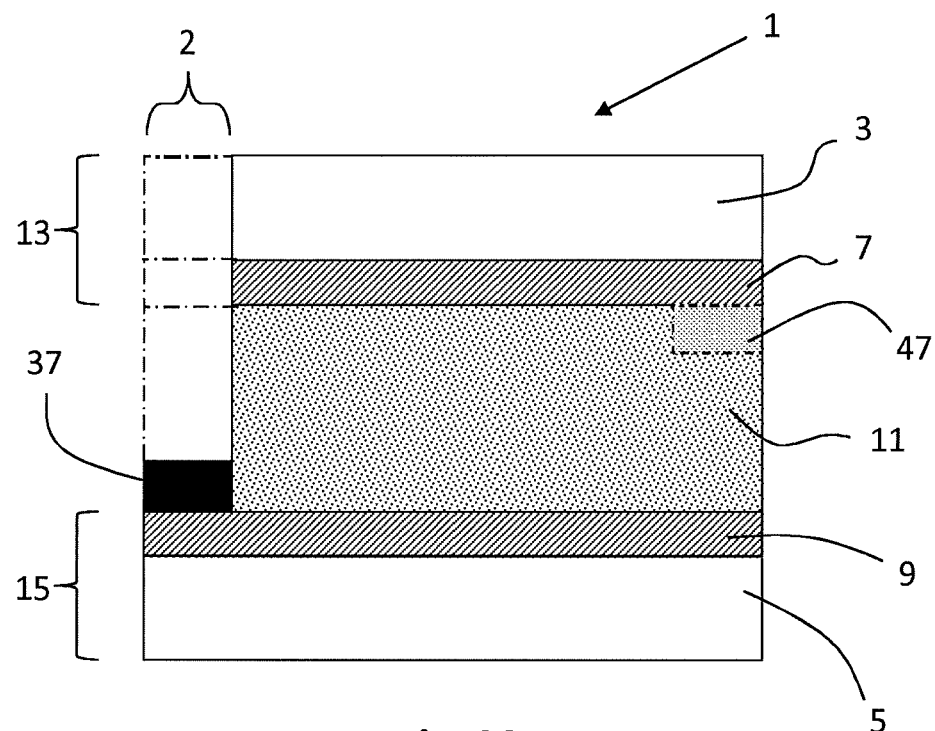
FIG. 23 shows a suspended particle device film having a direct galvanic connection to an electrode.
Figure 24:
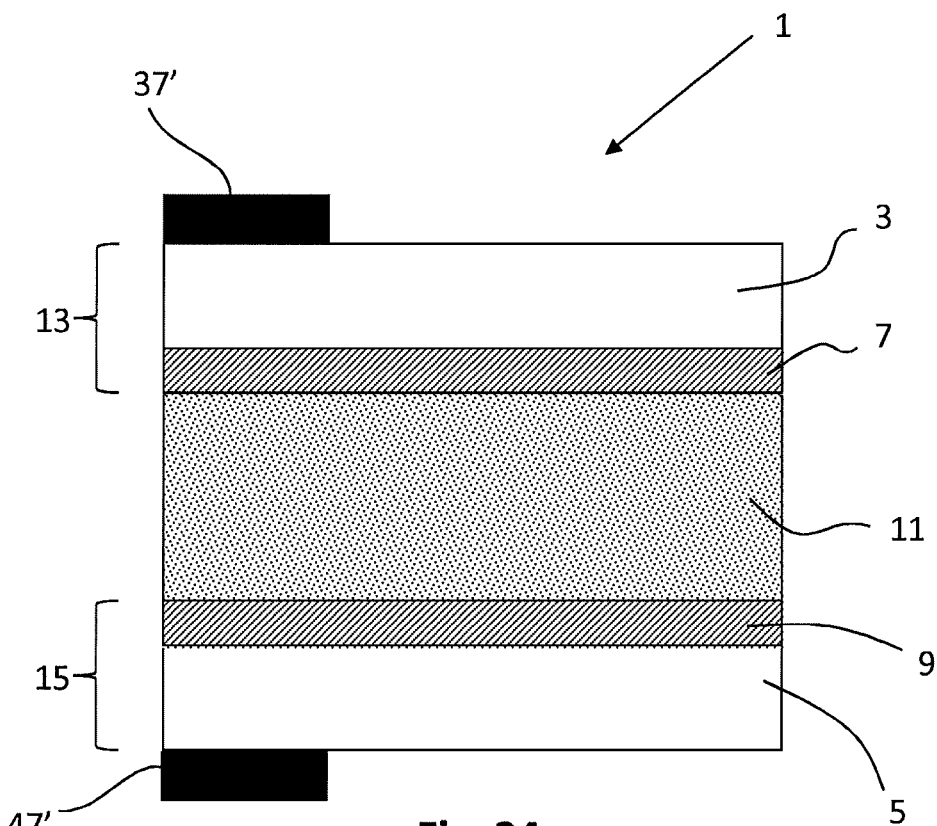
FIG. 24 shows a suspended particle device film having two electrical connector regions capacitively coupled to the electrically conductive coatings of the electrodes of a suspended particle device film.

Direct galvanic and remote connections are described in more detail in relation to FIGS. 23 and 24.

Figure 2:
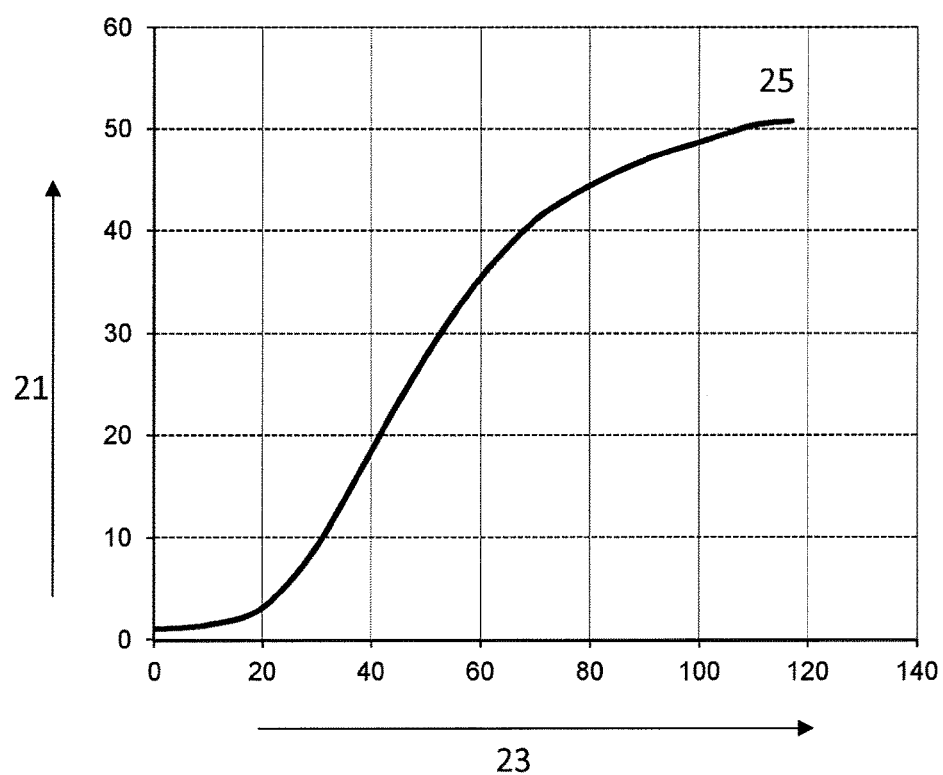
FIG. 2 shows the variation of light transmission through a suspended particle device film with voltage applied to the planar electrodes.

FIG. 2 shows how the transmission of a beam of light having a wavelength of 633 nm and passing through an SPD film of the type shown in FIG. 1 varies as a function of the magnitude of the voltage across the ITO coatings 7, 9.

Axis 21 represents the percentage of light (T) having a wavelength of 633 nm transmitted through the SPD film 1. Axis 23 represents the magnitude (rms) of a 50 Hz sinusoidally varying voltage applied across the ITO coatings 7, 9 of the SPD film 1.

For example, when no voltage is applied across the ITO coatings 7, 9, T is around 1% i.e. only 1% of the light at 633 nm that is incident on the SPD film passes through the SPD film. Opacity (O) is defined as 100-transmission i.e. 100-T, so when no voltage is applied across the ITO coatings 7, 9, the opacity O is (100−1)=99%.

When the magnitude of the voltage applied across the ITO coatings 7, 9 is 60V, T is around 35% i.e. 35% of the light at 633 nm that is incident on the SPD film passes through the SPD film. Hence at an applied voltage of 60V, the opacity of the SPD film is (100−35)=65%.

When the magnitude of the voltage applied across the ITO coatings 7, 9 is 120V, T is around 50% and the opacity O of the SPD film is 50%.

Increasing the magnitude of the voltage applied across the ITO coatings 7, 9 more than 120V has little or no change to the transmission (and hence the opacity O remains constant).

From FIG. 2, it is evident for a single SPD film, a range of light transmissions (or opacities) through the SPD film are possible depending upon the magnitude of the voltage applied across the ITO coatings 7, 9.

FIG. 2 is representative of the transmission of light through an SPD film having a particular thickness and a particular concentration of light absorbing particles in the layer 11. Varying the thickness of the SPD film and/or the concentration of light absorbing particles in the layer 11 may affect the minimum opacity level i.e. how much light is transmitted through the SPD film, although the general shape of the curve will be similar.

Figure 3:
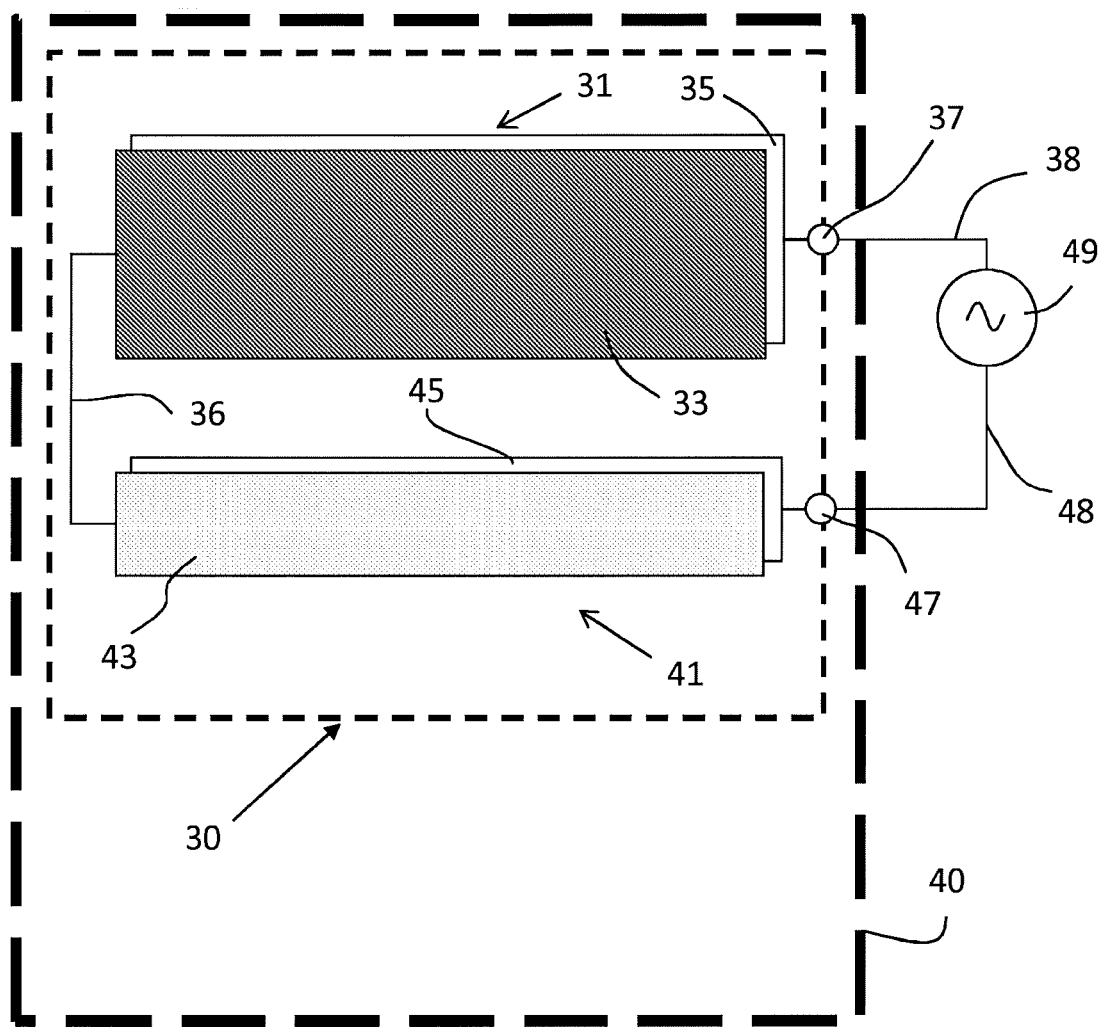
FIG. 3 shows a schematic plan view representation of a switchable device in accordance with the present invention.

FIG. 3 shows a schematic plan view representation of a switchable device 30 in accordance with the present invention.

The switchable device 30 is shown facing a pane of glass 40 (only shown schematically). The switchable device 30 may be attached to a major surface of the pane of glass. The switchable device may be part of an interlayer structure that is laminated between two or more glass panes.

It is known when laminating an SPD film between a pair of glass sheets to position the SPD film in a cut out region of a first sheet of adhesive interlayer material such as polyvinyl butyral, ethylene vinyl acetate copolymer, polyurethane etc, and to then position the first sheet of adhesive interlayer material having the SPD film incorporated therein between a second and third sheet of adhesive interlayer material. Each sheet of adhesive interlayer material may be the same material or different.

Alternatively the switchable device 30 may be positioned inside the cavity of an insulating glazing unit, such as a double glazed insulating glazing unit comprising two glass sheets spaced apart by at least one perimeter seal (thereby forming said cavity).

The switchable device 30 comprises a first SPD film 31 and a second SPD film 41. Each SPD film 31, 41 is as described in relation to FIG. 1. For clarity, the electrodes of each SPD film 31, 41 are shown slightly offset, although in the actual switchable device the electrode 33 is coextensive with the electrode 35 and the electrode 43 is coextensive with the electrode 45.

The first SPD film 31 is physically separate to the second SPD film 41 but in electrical communication therewith.

The first SPD film 31 is coplanar with the second SPD film 41. Given that the glass pane 40 may be curved in one or more direction, the first and second SPD films 31, 41 may follow the radius of curvature of the curved glass pane.

The SPD film 31 has a first electrode 33 and a second electrode 35. Between the electrodes 33, 35 is a layer (not shown) comprising the suspended particles.

The SPD film 41 has a first electrode 43 and a second electrode 45. Between the electrodes 43, 45 is a layer (not shown) comprising the suspended particles.

The SPD films 31, 41 are switchable regions that are able to change opacity to visible light upon application of a suitable voltage across the respective electrodes of each SPD film.

The second electrode 35 of SPD film 31 has a direct galvanic connection to a first electrical connector region 37. The second electrode 45 of SPD film 41 has a direction galvanic connection to a second electrical connector region 47.

The first electrode 33 of SPD film 31 has a direct galvanic connection 36 to the first electrode 43 of SPD film 41. As an alternative, the first electrode 33 of SPD film 31 may have a direct galvanic connection to the second electrode 45 of the SPD film 41. In this case, the first electrode 43 of the SPD film 41 would then have a direction galvanic connection to the second electrical connector region 47.

Although the SPD films 31, 41 are as described with reference to FIG. 1, the SPD film 31 has a larger surface area compared to the SPD film 41. In this example, the area of the major surface of the SPD film 31 is twice that of the SPD film 41. Treating each SPD film 31, 41 as a parallel plate capacitor the capacitance of which is given by $$\frac{\varepsilon A}{d},$$

where A is the plate (electrode) area and d the separation of the electrodes, the capacitance of SPD film 31 is twice that of the SPD film 41 (assuming the permittivity c of the layer between the electrodes is constant).

The first and second electrical connector regions 37, 47 are in electrical communication with a suitable AC power supply 49 via suitable leads 38, 48.

The first and second electrical connector regions 37, 47 may be on one of the major surfaces of the glass pane 40. Alternatively the first electrical connector region 37 may be on one major surface of the glass pane 40 and the second electrical connector region may be on the opposing major surface of the glass pane 40. The first and/or second electrical connector regions 37, 47 may be located at an edge portion of the glass pane 40.

Figure 4:
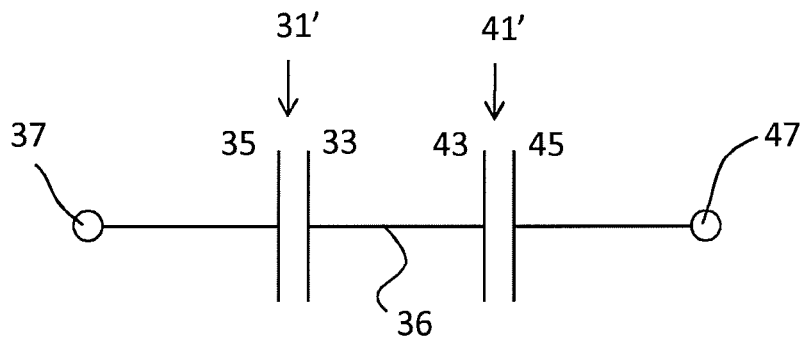
FIG. 4 show a circuit diagram representing the switchable device shown in FIG. 3.

FIG. 4 shows a circuit diagram representing the switchable device shown in FIG. 3. The two SPD films can be represented as two capacitors 31' and 41' connected electrically in series (SPD film 31 corresponds to capacitor 31' and SPD film 41 corresponds to capacitor 41'). Given that the capacitors 31' and 41' are electrically connected in series the charge on each capacitor 31', 41' is the same. Given that the capacitance of capacitor 31' is twice that of capacitor 41' and since C=Q/V, the voltage drop across the capacitor 31' is half that of the voltage drop across the capacitor 41'. Assuming an input voltage of 120V at 50 Hz is applied across the first and second electrical connector regions 37, 47, the voltage drop across the SPD film 31 will be 40V and the voltage drop across the SPD film 41 will be 80V.

With reference to FIG. 2, the SPD film 41 has become more transmitting (has a lower opacity) than the SPD film 31 i.e. the SPD film 31 will be darker than the SPD film 41 when the electrical connector regions 37, 47 are connected to the 120V at 50 Hz power supply.

As is evident with reference to FIG. 2, before connecting the first and second electrical connector regions 37, 47 to the terminals of a suitable AC power supply 49, the SPD films 31, 41 are both in a high opacity (low transmission to light) state. Upon connecting the first and second electrical connector regions 37, 47 to the terminals of the suitable AC power supply 49, the opacity of each SPD film 31, 41 decreases (the transmission of light through each SPD film 31, 41 is greater than when the first and second electrical connector regions 37, 47 are not electrically connected to the terminals of the suitable AC power supply 49) and the SPD film 41 has become more transmitting (has a lower opacity) than the SPD film 31 i.e. the SPD film 31 is darker than the SPD film 41.

Figure 5:
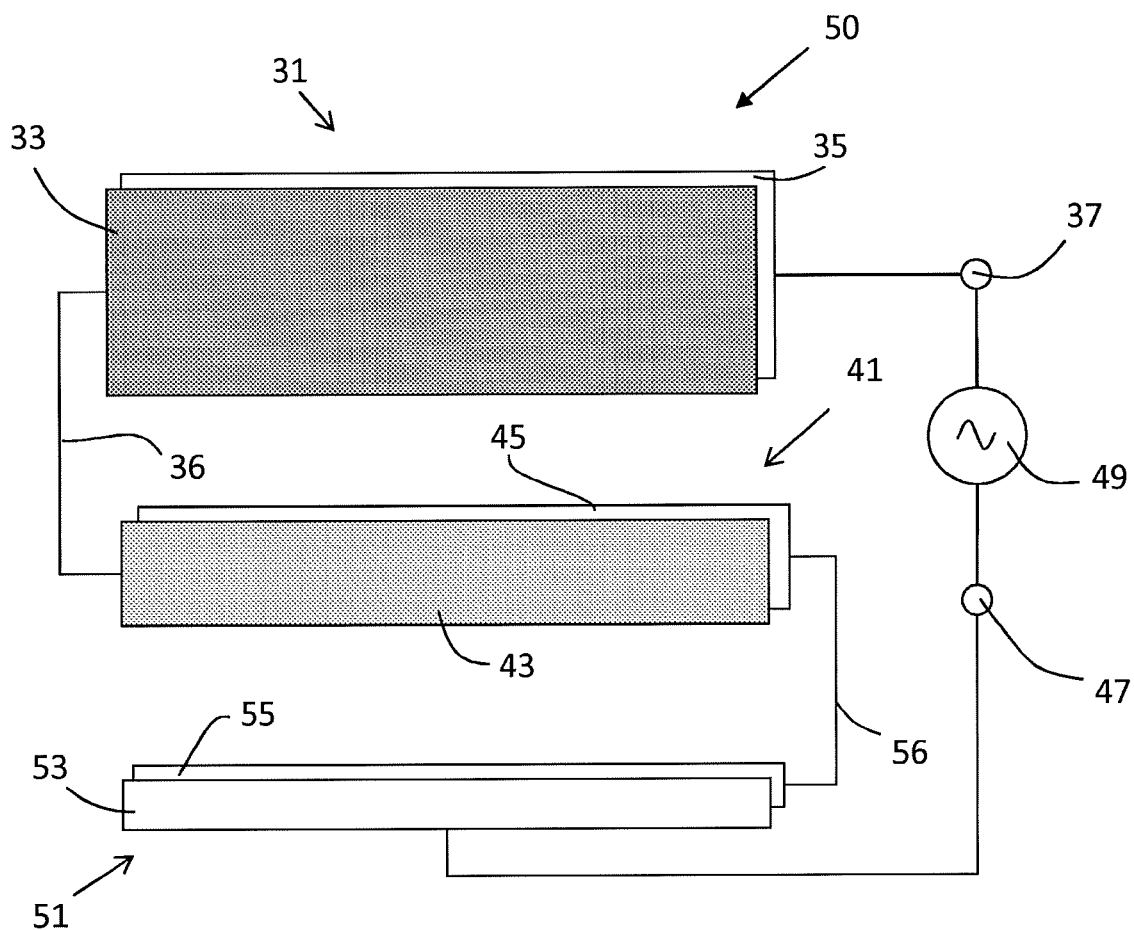
FIG. 5 shows a schematic representation of another switchable device in accordance with the present invention.

FIG. 5 shows another switchable device 50 in accordance with the present invention. The switchable device 50 is similar to the switchable device 30 in that there is an SPD film 31 electrically connected in series with an SPD film 41.

The switchable device 50 also has a third SPD film 51. The SPD film 51 has a first electrode 53 and a second electrode 55. Between the electrodes 53, 55 is a layer (not shown) comprising the suspended particles.

In contrast to FIG. 3 where the switchable device 30 had two switchable regions provided by the SPD films 31 and 41, the switchable device 50 has three switchable regions provided by the SPD films 31, 41 and 51. Each of the SPD films 31, 41, 51 are physically separate from each other, although they may be arranged such that edges regions thereof are in contact, providing the electrical properties are not affected i.e. the SPD films 31, 41, 51 each function as if it was physically separate from the others.

The second electrode 45 of the SPD film 41 has a direct galvanic connection 56 to the second electrode 55 of the SPD film 51. The first electrode 53 of the SPD film 51 has a direct galvanic connection to the electrical connector region 47.

As described in relation to FIG. 3, the electrodes 33, 35 of the SPD film 31 have twice the surface area of the electrodes of the SPD film 41 so the capacitance of the SPD film 31 is twice that of the SPD film 41. The electrodes 43, 45 of the SPD film 41 have twice the surface area of the electrodes 53, 55 of the SPD film 51 so the capacitance of the SPD film 41 is twice that of the SPD film 51.

Figure 6:
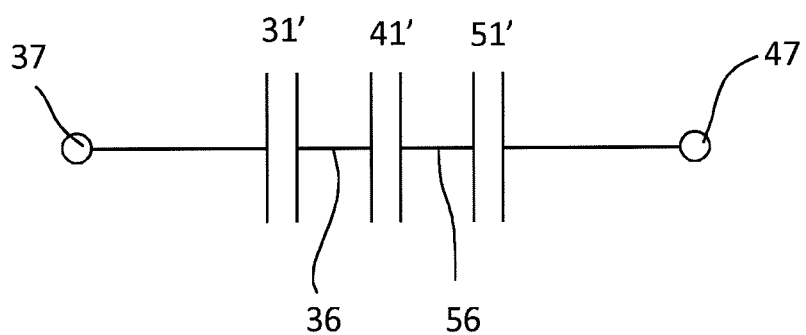
FIG. 6 shows a circuit diagram representing the switchable device shown in FIG. 5.

With reference to FIG. 6, the switchable device 50 may be represented as three capacitors electrically connected in series between the first electrical connector region 37 and the second electrical connector region 47. If the capacitance of the SPD film 51 (capacitor 51') is denoted as C, then the capacitance of the SPD film 41 (capacitor 41') is 2C and the capacitance of the SPD film 31 (capacitor 31') is 4C. Given that the charge on each capacitor electrically connected in series is the same, it is possible to determine the voltage drop across each capacitor. For an input voltage of 120V at 50 Hz across between the first and second electrical connector regions 37, 47, the voltage across the SPD film 31 is 17.14V, the voltage across the SPD film 41 is 34.28V and the voltage across the SPD film 51 is 68.57V.

It is possible using FIG. 2 to determine the opacity of each SPD film 31, 41, 51 in the switchable device 50. Given that the SPD film 51 has the highest voltage drop across the electrodes, the SPD film 51 will have a higher transmission of visible light than the SPD film 41 or the SPD film 31. Given that the SPD film 31 has the lowest voltage drop across the electrodes, the SPD film 31 will have a lower transmission of visible light than the SPD film 41 or the SPD film 51.

It will be readily apparent that by altering the magnitude of the input voltage across the electrical connector regions 37, 47 the opacity of the SPD films 31, 41, 51 may be changed further. For example, for a higher input voltage across electrical connector regions 37, 47 the opacities of the SPD films 31, 41, 51 will be reduced because the voltage drop across the three SPD films will be higher.

If a power supply is used that has too high magnitude voltage, all the SPD films may switch to minimum opacity, thereby preventing the switchable device from functioning in accordance with the present invention.

It will be readily apparent that additional SPD films may be electrically connected in series. By varying the capacitance of the additional SPD films, for example by altering the size of the SPD film i.e. by cutting the SPD film, the opacity of all the SPD films can be changed. This can be compensated by using a higher input voltage to obtain the desired opacity in each SPD film.

Figure 7:
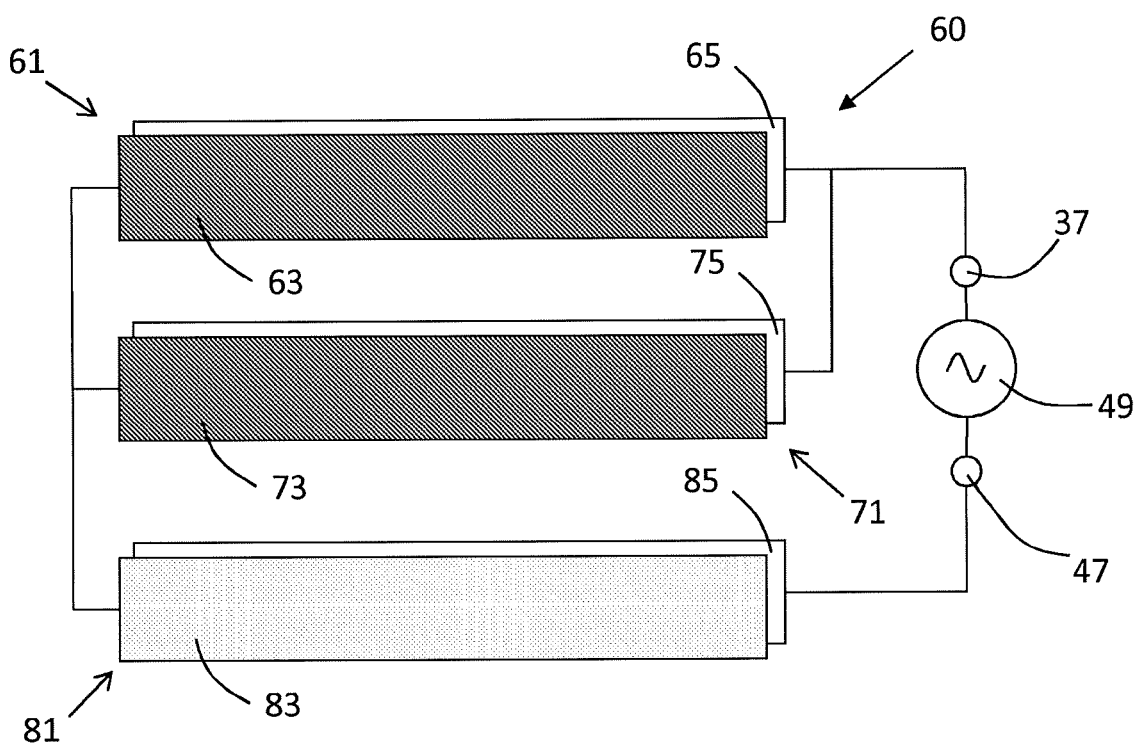
FIG. 7 shows a schematic representation of another switchable device in accordance with the present invention.

Another embodiment of the present invention is shown in FIG. 7.

FIG. 7 shows a switchable device 60 comprising three strips of SPD film 61, 71, 81 of the type described with reference to FIG. 1. As with FIGS. 3 and 5, the planar electrodes of each SPD film are shown offset for clarity only.

The strips of SPD film 61, 71, 81 may be coplanar.

The strips of SPD film 61, 71, 81 are physically separate.

There is a first strip of SPD film 61 that has a first electrode 63 and a second electrode 65. Between the electrodes 63, 65 is a layer (not shown) comprising the suspended particles.

There is a second strip of SPD film 71 that has a first electrode 73 and a second electrode 75. Between the electrodes 73, 75 is a layer (not shown) comprising the suspended particles.

There is a third strip of SPD film 81 that has a first electrode 83 and a second electrode 85. Between the electrodes 83, 85 is a layer (not shown) comprising the suspended particles.

The strips of SPD film 61, 71, 81 are switchable regions that are able to change opacity to visible light upon application of a suitable voltage across the respective electrodes.

The switchable device 60 has a first electrical connector region 37 and a second electrical connector region 47. The second electrodes 65, 75 are in electrical communication with the first electrical connector region 37. In the present example, the second electrodes 65, 75 have a direct galvanic connection to the first electrical connector region 37.

The first electrodes 63, 73 are in electrical communication with the first electrode 83. In this example the first electrodes 63, 73 have a direct galvanic connection to the first electrode 83. The second electrode 85 is in electrical communication with the second electrical connector region 47. In this example the second electrode 85 has a direct galvanic connection to the second electrical connector region 47.

Each strip of SPD film 61, 71, 81 has the same dimensions such that the capacitance of each strip of SPD film 61, 71, 81 is the same. In this example the major surface of each strip of SPD film 61, 71, 81 is rectangular in outline having a length of 50 cm and a width of 2 cm.

A suitable power supply 49 is configured for connection to the first and second electrical connector regions 37, 47. The power supply generates a sinusoidal output having a magnitude of 120V peak to peak at 50 Hz.

Figure 8:
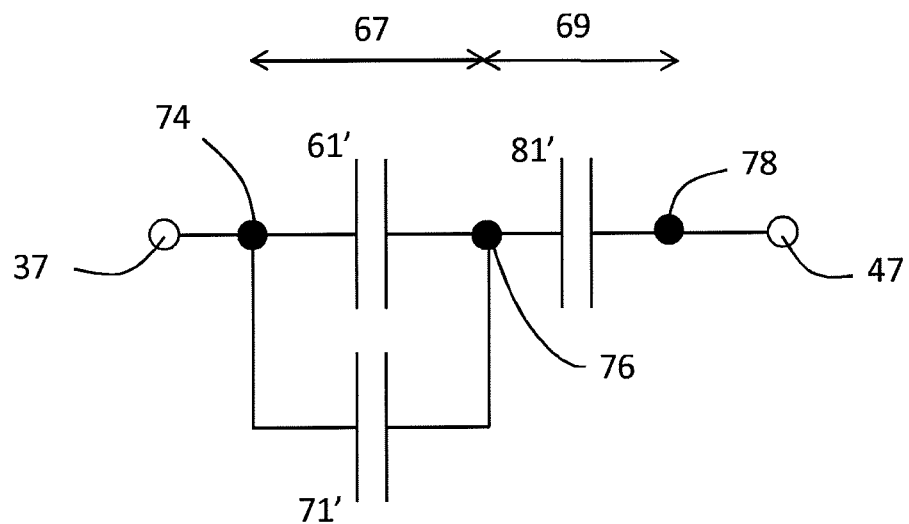
FIG. 8 shows a circuit diagram representing the switchable device shown in FIG. 7.

Upon connecting power supply 49 to the first and second electrical connector regions, the opacity of the strips of SPD film 61, 71, 81 changes as described with reference to FIG. 2. FIG. 8 is used to determine the voltage across each strip of SPD film 61, 71, 81.

FIG. 8 shows a circuit diagram representation of the switchable device 60. Each strip of SPD film 61, 71, 81 is represented by capacitors 61', 71', 81' respectively.

The circuit diagram has two branches 67, 69. The first branch 67 is between nodes 74, 76. The second branch is between nodes 76, 78. Node 74 has a direct galvanic connection to the first electrical connector region 37 and node 78 has a direct galvanic connection to the second electrical connector region 47.

Capacitors 61', 71' in branch 67 are connected in parallel in the first branch. As such the first branch consists of two arms. The first arm consists of single capacitor 61' and the second arm consists of single capacitor 71'. The second branch has a single arm consisting of single capacitor 81'.

Therefore in accordance with equation (4) the first branch 67 may be represented as $I_1^1 + I_2^1$ and second branch 69 may be represented as $I_1^2$. In accordance with equation (8) capacitor 61' may be represented as $_1s_1^1$, capacitor 71' may be represented as $_1s_1^2$ and capacitor 81' may be represented as $_2s_1^1$.

Since each strip of SPD film 61, 71, 81 has the same capacitance (=C), each capacitor 61', 71', 81' has the same capacitance. It is therefore possible to determine the voltage across each branch.

The equivalent capacitance of branch 67 is 2C. Therefore for an input voltage of 120V across the first and second electrical connector regions 37, 47, the voltage across branch 67 is 40V and the voltage across branch 69 is 80V.

As a result of this voltage difference over the two branches, and with reference to FIG. 2, the strips of SPD film 61, 71 will have less of an increase in transmission than the strip of SPD film 81. That is, the opacity of each strip of SPD film 61, 71, 81 changes but the strip of SPD film 81 has a lower opacity to visible light than the strips of SPD film 61, 71 (because the voltage across branch 69 is higher).

Given that the maximum voltage across the branches is only 80V, the opacity has not been reduced to the lowest value (with reference to FIG. 2, the lowest opacity is about 50%, whereas for an input voltage of 80V, the opacity is about (100−44)≈56%). To reduce opacity the magnitude of the voltage of the power supply may be increased. In the above example, the magnitude of the power supply would need to be 180V to achieve 120V across branch 69 (with a corresponding 60V across branch 67).

The switchable device 60 therefore has three switchable regions where each switchable region has a change in opacity upon connection to a suitable power supply.

Figure 9:
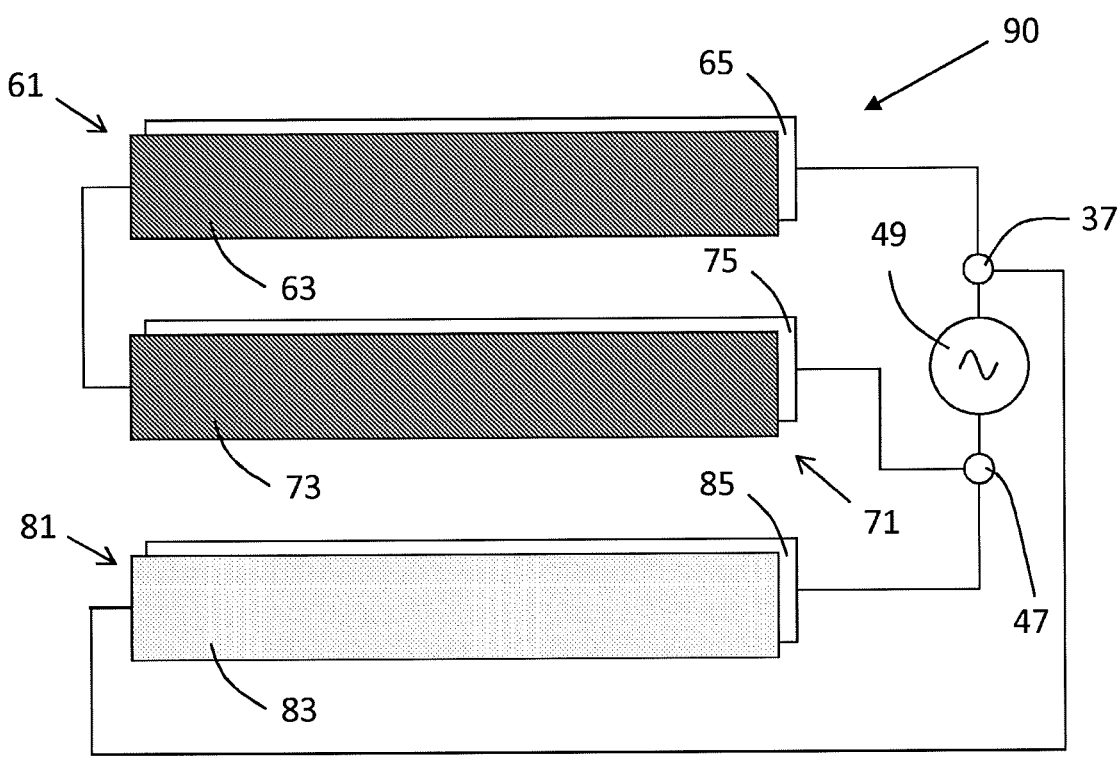
FIG. 9 shows a schematic representation of another switchable device in accordance with the present invention.

FIG. 9 shows another switchable device 90 comprising three strips of SPD film 61, 71, 81 of the type described with reference to FIG. 1. As with FIGS. 3 and 5, the planar electrodes of each SPD film are shown offset for clarity only. The strips of SPD film 61, 71, 81 are the same as in the previous example and shown in FIG. 7, but in FIG. 9 the strips of SPD films 61, 71, 81 are electrically connected differently in the switchable device 90.

The first strip of SPD film 61 has a first electrode 63 and a second electrode 65. Between the electrodes 63, 65 is a layer (not shown) comprising the suspended particles. The second strip of SPD film 71 has a first electrode 73 and a second electrode 75. Between the electrodes 73, 75 is a layer (not shown) comprising the suspended particles. The third strip of SPD film 81 has a first electrode 83 and a second electrode 85. Between the electrodes 83, 85 is a layer (not shown) comprising the suspended particles.

The switchable device 90 has a first electrical connector region 37 and a second electrical connector region 47. The second electrode 65 is in electrical communication with the first electrical connector region 37. The first electrode 63 is in electrical communication with the first electrode 73. The second electrode 75 is in electrical communication with the second electrical connector region 47.

The first electrode 83 is in electrical communication with the first electrical connector region 37. The second electrode 85 is in electrical communication with the second electrical connector region 47.

In the example shown in FIG. 9, all the electrical connections are direct galvanic connections.

A suitable power supply 49 is configured for connection to the first and second electrical connector regions 37, 47. The power supply generates a sinusoidal output having a peak to peak voltage of 120V at 50 Hz.

Upon connecting power supply 49 to the first and second electrical connector regions 37, 47, the opacity of the strips of SPD film 61, 71, 81 changes as described with reference to FIG. 2 and FIG. 10.

Figure 10:
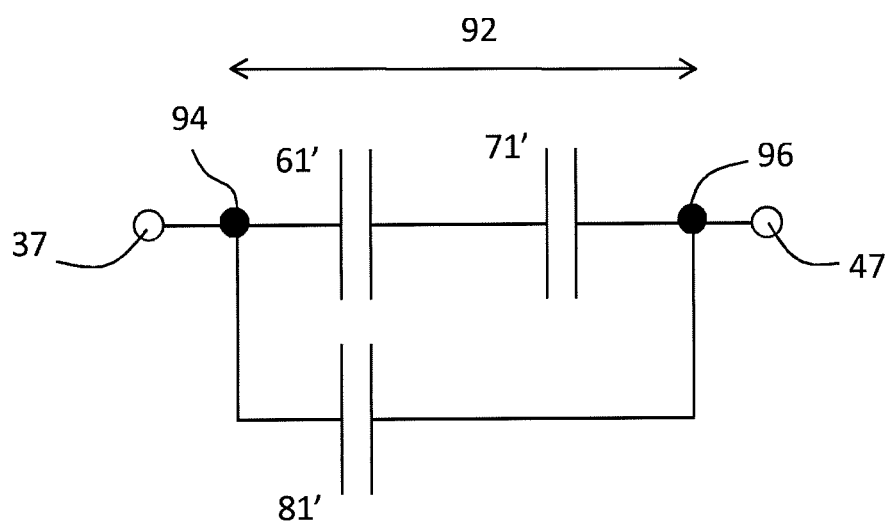
FIG. 10 shows a circuit diagram representing the switchable device shown in FIG. 9.

FIG. 10 shows a circuit diagram representation of the switchable device 90. Each strip of SPD film 61, 71, 81 is represented by capacitors 61', 71', 81' respectively.

The circuit diagram has one branch 92 between nodes 94, 96. Node 94 has a direct galvanic connection with first electrical connector region 37 and node 96 has a direct galvanic connection with second electrical connector region 47.

Branch 92 has two arms. The first arm has capacitors 61', 71' electrically connected in series. The second arm consists of single capacitor 81'.

Therefore in accordance with equation (4) the branch 92 may be represented as $I_1^1 + I_2^1$. Given that there is only one branch, B=1. In accordance with equation (8) capacitor 61' may be represented as $^1s_1^1$, capacitor 71' may be represented as $^1s_2^1$ and capacitor 81 may be represented as $^1s_1^2$.

Since each strip of SPD film 61, 71, 81 has the same capacitance (=C), each capacitor 61', 71', 81' has the same capacitance. It is therefore possible to determine the voltage across each capacitor (and hence each switchable region 61, 71, 81).

The equivalent capacitance of the first arm (capacitor 61' electrically connected in series with capacitor 71') is ½C.

For an input voltage of 120V across the first and second electrical connector regions 37, 47, the voltage across each capacitor 61', 71' is 60V and the voltage across capacitor 81' is 120V.

As a result of this voltage across the branches, and with reference to FIG. 2, the strips of SPD film 61, 71 will have less of an increase in transmission than the strip of SPD film 81. That is, the opacity of each strip of SPD film 61, 71, 81 changes but the strip of SPD film 81 has a lower opacity to visible light than the strips of SPD film 61, 71.

With reference to FIG. 2, for an input voltage of 120V the strip of SPD film 81 is able to attain the lowest opacity (highest transmission) whereas the voltage across the strip of SPD film 61, 71 is only 60V so that the opacity is about (100−35)≈65%).

The switchable device 90 therefore has three switchable regions where each switchable region has a change in opacity upon connection to a suitable power supply.

Figure 11:
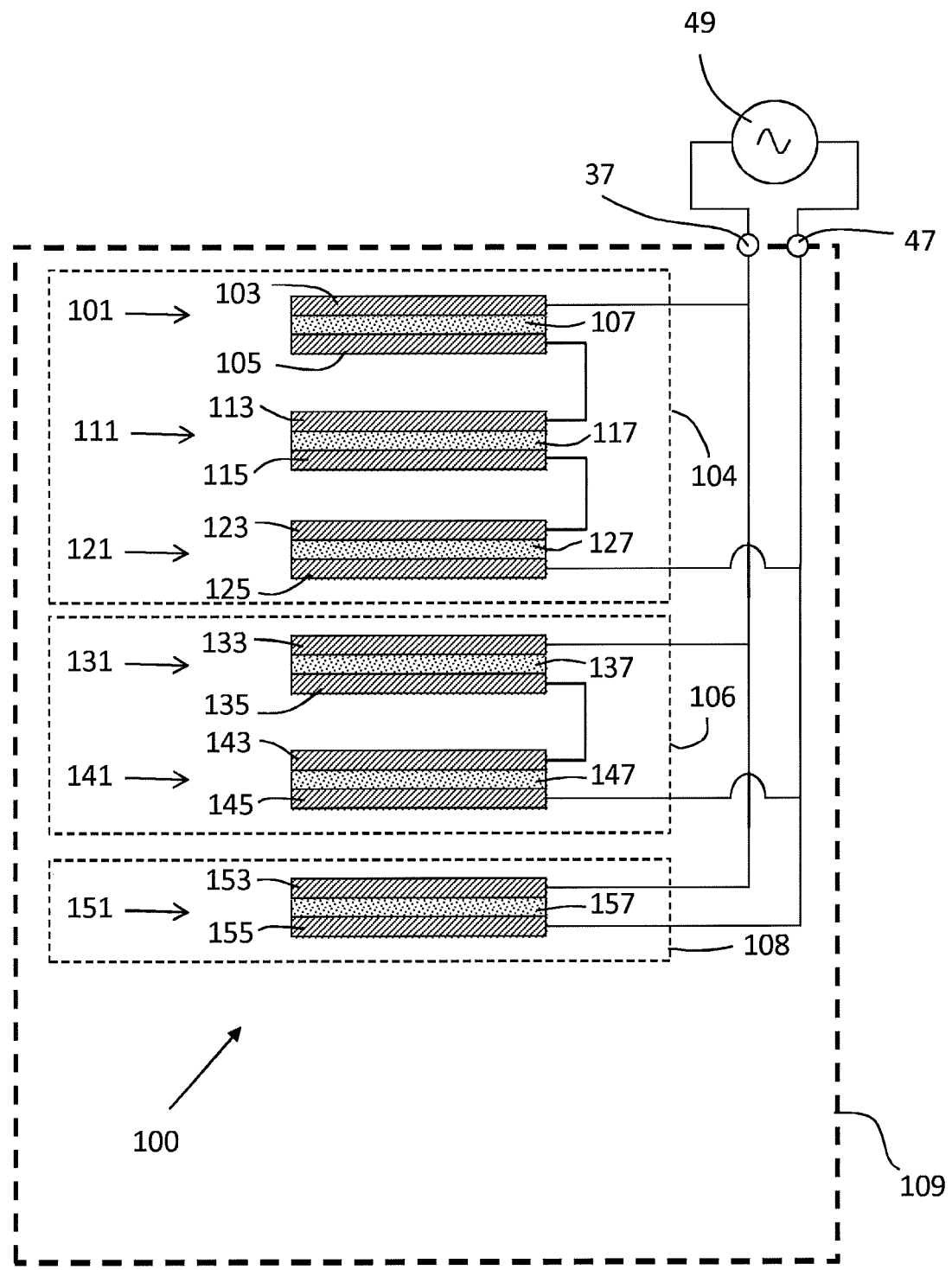
FIG. 11 shows a schematic representation of another switchable device in accordance with the present invention.

FIG. 11 shows another switchable device 100 comprising six switchable regions in the form of separate strips of SPD film 101, 111, 121, 131, 141 and 151. The switchable device 100 is shown as part of a glazing comprising a sheet of glazing material 109 (only shown schematically). The switchable device 100 faces a major surface of the sheet of glazing material 109.

Each strip of SPD film 101, 111, 121, 131, 141 and 151 has a structure as shown in FIG. 1. That is, each strip of SPD film has a first electrode and a second electrode, between which is a variable opacity layer comprising the suspended particles.

The first strip of SPD film 101 has a first electrode 103 and a second electrode 105 with a layer 107 comprising the suspended particle therebetween.

The second strip of SPD film 111 has a first electrode 113 and a second electrode 115 with a layer 117 comprising the suspended particle therebetween.

The third strip of SPD film 121 has a first electrode 123 and a second electrode 125 with a layer 127 comprising the suspended particle therebetween.

The fourth strip of SPD film 131 has a first electrode 133 and a second electrode 135 with a layer 137 comprising the suspended particle therebetween.

The fifth strip of SPD film 141 has a first electrode 143 and a second electrode 145 with a layer 147 comprising the suspended particle therebetween.

The sixth strip of SPD film 151 has a first electrode 153 and a second electrode 155 with a layer 157 comprising the suspended particle therebetween.

Each strip of SPD film 101, 111, 121, 131, 141, 151 is configured to have the same capacitance. This may be achieved by using strips of SPD film having the same length and width and same separation of electrodes. This is conveniently achieved by cutting the strips from a large "mother sheet" of SPD film. In this example each strip of SPD film has a length of 50 cm and a width of 2 cm.

In FIG. 11, each strip of SPD film is shown in cross section and only the electrically conductive ITO coatings of the respective electrodes are shown. As shown in FIG. 1, the electrically conductive coating of ITO is on a major surface of a PET sheet which acts as a carrier for the ITO coating.

FIG. 12 shows a circuit diagram representation of the switchable device 100.

With reference to FIGS. 11 and 12, the switchable device 100 comprises one branch 102 and three arms 104, 106 and 108.

In the first arm 104 the electrode 103 of SPD film 101 is in electrical communication with the first electrical connector region 37. In this example there is a direct galvanic connection between the electrode 103 and the electrical connector region 37.

Electrode 105 of SPD film 101 is in electrical communication with the electrode 113 of SPD film 111. In this example there is a direct galvanic connection between the electrode 105 and the electrode 113.

Electrode 115 of SPD 111 is in electrical communication with electrode 123 of SPD film 121. In this example there is a direct galvanic connection between the electrode 115 and the electrode 123.

Electrode 125 of SPD film 121 is in electrical communication with the second electrical connector region 47. In this example there is a direct galvanic connection between the electrode 125 and the second electrical connector region 47.

In the second arm 106 the electrode 133 of SPD film 131 is in electrical communication with the first electrical connector region 37 (and hence the electrode 103 of SPD film 101). In this example there is a direct galvanic connection between the electrode 133 and the first electrical connector region 37.

The electrode 135 of SPD film 131 is in electrical communication with the electrode 143 of SPD film 141. In this example there is a direct galvanic connection between the electrode 135 and the electrode 143.

The electrode 145 of SPD film 141 is in electrical communication with the second electrical connector region 47 (and hence the electrode 125 of SPD film 121). In this example there is a direct galvanic connection between the electrode 145 and the second electrical connector region 47.

In the third arm 108 the electrode 153 of SPD film 151 is in electrical communication with the first electrical connector region 37 (and hence the electrode 103 of SPD film 101 and the electrode 133 of SPD film 131). In this example there is a direct galvanic connection between the electrode 153 and the first electrical connector region 37.

The electrode 155 of SPD film 151 is in electrical communication with the second electrical connector region 47 (and hence the electrode 125 of SPD film 121 and the electrode 145 of SPD film 141). In this example there is a direct galvanic connection between the electrode 155 and the second electrical connector region 47.

Upon connecting the first and second electrical connector regions 37, 47 to a suitable power supply 49 (for example an alternating voltage, in particular a sinusoidal varying voltage, having a magnitude of 120-240V and a frequency of 50-60 Hz), the opacity of the SPD films in the arms 104, 106, 108 change as will be described in more detail with particular reference to FIG. 12.

FIG. 12 shows a circuit diagram representing the switchable device 100.

The switchable device 100 has one branch 102 and three arms 104, 106 and 108. The first arm 104 is between nodes 120 and 122, the second arm 106 is between nodes 130 and 132 and the third arm 108 is between nodes 140 and 142. Each node 120, 130, 140 has a direct galvanic connection to the first electrical connector region 37 and each node 122, 132, 142 has a direct galvanic connection to the second electrical connector region 47.

Each SPD film 101, 111, 121, 131, 141, 151 is represented by a capacitor 101', 111', 121', 131', 141', 151' respectively.

The first arm 104 has capacitors 101', 111' and 121' electrically connected in series. The second arm 106 has capacitors 131' and 141' electrically connected in series. The third arm 108 has single capacitor 151' between the nodes 140, 142.

As can be seen, the arms 104, 106, 108 are electrically connected in parallel across the first and second electrical connector regions 37, 47.

Given that all the capacitors 101', 111', 121', 131', 141' and 151' have the same capacitance (because the capacitance of the SPD strips 101, 111, 121, 131, 141, 151 are the same), for an input voltage of 120V at 50 Hz across the first and second electrical connector regions 37, 47, in the first arm 104 there is a voltage of 40V across each capacitor 101', 111' and 121'. In the second arm 106 there is a voltage across each capacitor of 60V and in the third arm 108 the voltage across the capacitor 151' is 120V.

Therefore upon connecting the switchable device 100 to a suitable power supply 49, the opacity of the strips of SPD film 101, 111 and 121 changes to a first opacity, the opacity of the strips of SPD film 131 and 141 change to a second opacity and the opacity of the strip of SPD film 151 changes to a third opacity. The change in opacity of each strip of SPD film can be determined with reference to FIG. 2. For example, for a voltage of 40V across the SPD film, the opacity is about (100−18) %=82% i.e. the first opacity is 82%. For a voltage of 60V across the SPD film, the opacity is about (100−35) %=65% i.e. the second opacity is 65%. For a voltage of 120V across the SPD film, the opacity is about (100−50) %=50% i.e. the third opacity is 50%.

As can be seen from FIG. 11, the switchable device 100 only requires two electrical inputs (electrical connector regions 37, 47) to change the opacity of all the strips of SPD film 101, 111, 121, 131, 141 and 151. The arrangement of the strips of SPD films simplifies the number of electrical connections that are needed to switch the switchable device 100, also reducing the need to use bulky external capacitors to obtain the desired switching voltage across each strip of SPD film.

In accordance with equation (4) the branch 102 may be represented as $I_1^1 + I_2^1 + I_3^1$ (i.e. arm $104 \equiv I_1^1$, arm $106 \equiv I_2^1$ and arm $108 \equiv I_3^1$). Given that there is only one branch, B=1. The switchable regions can be defined in terms of equation (8). In arm $I_1^1$ the capacitor 101' may be represented as $^1s_1^1$, capacitor 111' may be represented as $^1s_2^1$ and capacitor 121 may be represented as $^1s_3^1$. In arm $I_2^1$ the capacitor 131' may be represented as $^1s_1^2$ and capacitor 141' may be represented as $^1s_2^2$. In arm $I_3^1$ the capacitor 151' may be represented as $^1s_1^3$.

Figure 14:
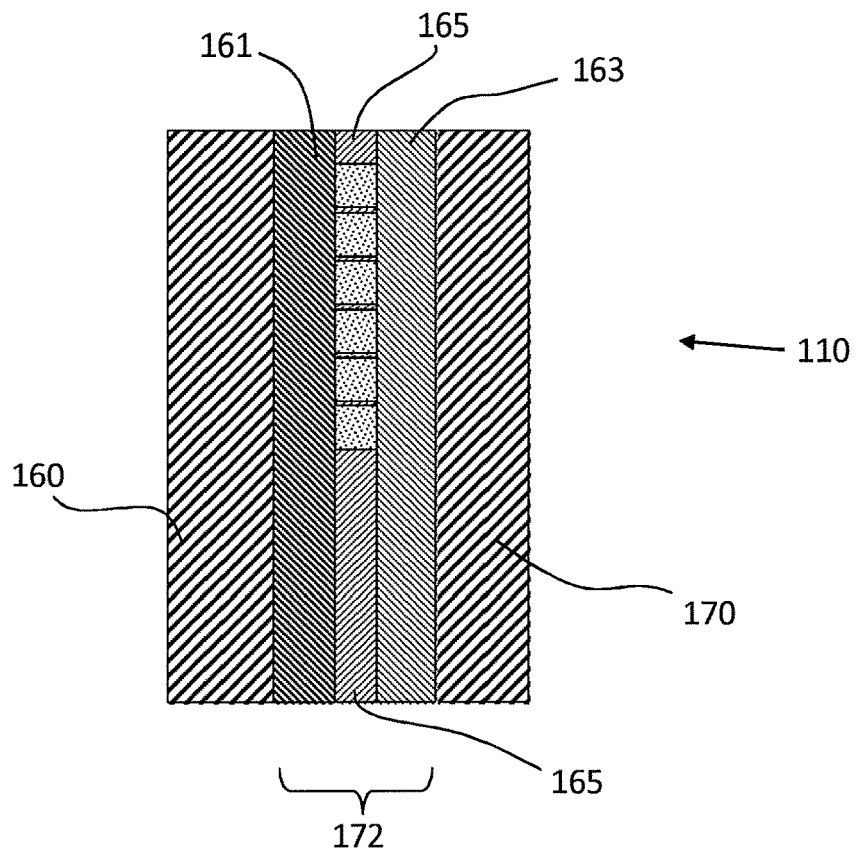
FIG. 14 shows a cross-sectional view of the glazing shown in FIG. 13.

FIG. 13 shows a plan view of a portion of a glazing 110 comprising the switchable device 100. FIG. 14 shows a cross-sectional view of the glazing 110 viewed in the direction A-A' shown in FIG. 13.

The plan view of FIG. 13 shows how the switchable device 100 is located towards a peripheral edge region of the glazing, and not in the centre of the glazing. For example, a portion of the glazing is not able to have the opacity changed because there are no switchable regions in said portion. The configuration shown in FIG. 13 is useful when using the switchable device as a shade band in a vehicle windscreen.

Although the strips of SPD film 101, 111, 121, 131, 141, 151 are physically separate before being connected to form the switchable device 100, when incorporated into the switchable device the longitudinal edges of adjacent strips of SPD film may contact to give an appearance of no gaps therebetween. Such gaps between the individual strips of SPD film would give the impression that the shade band was not continuous, and it is usually required that the shade band has a continuous variation in opacity from high to low. If there is any physical contact between the strips of SPD film, the target is that such contact does not affect the way the SPD film switches i.e. the strips of SPD film behave as if there was no physical contact.

If desired, the entire viewable area of the glazing may be covered by the switchable device.

The switchable device 100 is configured to face the major surfaces of the pané of glazing material 160. In this particular example the glazing 110 is a laminated glazing comprising two spaced apart panes of glazing material such as glass (i.e. soda-lime-silica glass, in particular float glass) or plastic (i.e. polycarbonate) with an interlayer structure in between.

In FIG. 13, the shading of the strips of SPD film 101, 111, 121, 131, 141, 151 is used to illustrate the switchable device 100 in the "switched on" configuration i.e. a suitable power supply has been connected to the electrical connector regions 37, 47.

The overall impression is that the glazing 110 has a region of a graded transmission, going from dark to light, as is typical in a fade band in the vehicle windscreen. The coarseness of the gradation in opacity may be changed by using more strips that are less wide, for example instead of six strips 50 cm long by 2 cm wide, there may be twelve strips 50 cm long and 1 cm wide.

Depending upon the properties of the desired graded transmission region, the strips of SPD films may not all have the same length and/or width.

Figure 15:
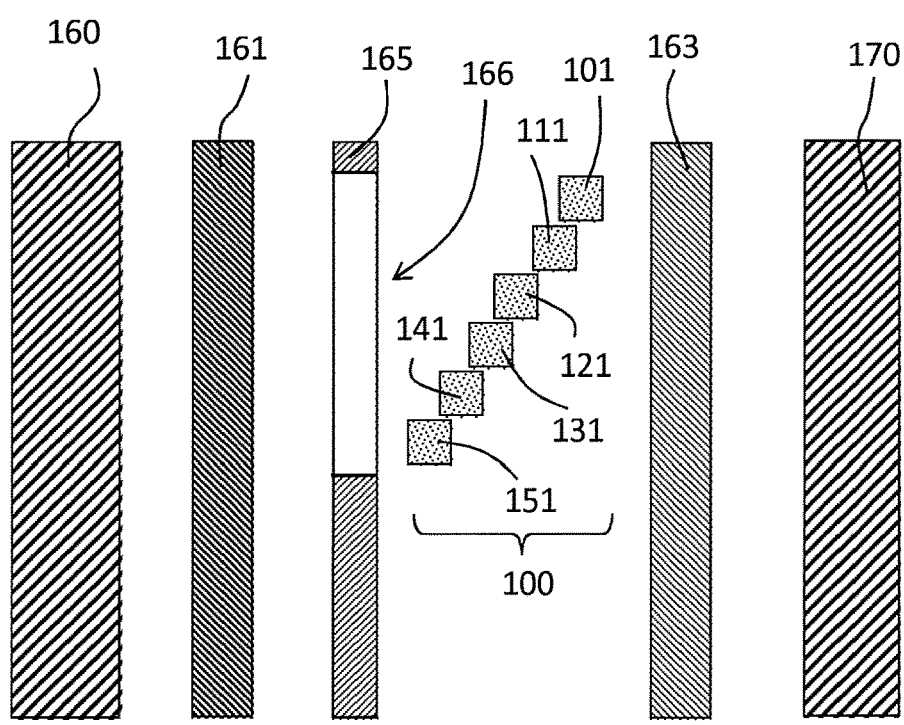
FIG. 15 shows an exploded cross-section view of the glazing shown in FIG. 13.

FIG. 14 shows how the switchable device 100 is incorporated in the glazing 110. FIG. 15 shows an exploded view of FIG. 14.

The glazing 110 has a first glass pane 160 joined to a second glass pane 170 by means of interlayer structure 172. The interlayer structure has a first sheet of adhesive interlayer material 161, a second sheet of adhesive interlayer material 163 and a third sheet of adhesive interlayer material 165.

In the present example the first, second and third sheets 161, 163, 165 of adhesive interlayer material are polyvinyl butyral (PVB) although any of the first, second and third sheets of adhesive interlayer material may be ethylene vinyl acetate copolymer, polyurethane or poly vinyl chloride.

The first sheet of adhesive interlayer material 161 is in contact with and coextensive with a major surface of the glass pane 160. The second sheet of adhesive interlayer material 163 is in contact with and coextensive with a major surface of the glass pane 170. The third sheet of adhesive interlayer 165 is in contact with both the first and second sheets of adhesive interlayer material.

The third sheet of adhesive interlayer material 165 has a cut-out region 166 therein. The switchable device 110 is located in the cut-out region 166 in the third sheet of adhesive interlayer material 165.

The glazing 110 may be produced by first laying up glass pane 160 such that a major surface thereof is facing upwards. Next, the sheet of PVB 161 is placed on the upwardly facing major surface of the glass pane 160. Next the sheet of PVB 165 with cut-out region 166 therein is placed on the sheet of PVB 161. Next the switchable device 110 is positioned in the cut-out region 166 in the sheet of PVB 165. The switchable device may be constructed before being positioned in the cut-out region 166. Next the sheet of PVB 163 is positioned on the sheet of PVB 165 having the switchable device located in cut-out region 166 therein. Next pane of glass 170 is positioned on the sheet of PVB 163.

The assembly of glass pane 160, sheet of PVB 161, sheet of PVB 165 having switchable device 110 located in a cut-out region therein, sheet of PVB 163 and glass pane 170 are then laminated at suitably high temperature and pressure such that the glass pane 160 is joined to the glass pane 170 by means of the interlayer structure 172.

The glazing 110 may be an automotive glazing such as a rooflight, side window, backlight or windscreen.

Preferably the sheet of glazing material is a sheet of glass having a soda-lime-silicate composition such as clear float glass. By clear float glass, it is meant a glass having a composition as defined in BS EN 572 1 and BS EN 572-2 (2004). Suitably the glass sheet is tinted with one or more additives such as iron oxide, selenium, nickel oxide and cobalt oxide.

Preferably the sheet of glazing material has a thickness between 1.5 mm and 3.5 mm, more preferably between 1.6 mm and 2.3 mm.

Although the glazing 110 is shown as being flat, the glazing 110 may be curved, for example the sheets of glazing material may have been bent such that the sheet of glazing material is curved in at least one direction. Preferably the radius of curvature in the at least one direction is between 500 mm and 20000 mm, more preferably between 1000 mm and 8000 mm.

The glazing 110 may have more than one switchable device such that two regions of graded transmission are operable within the glazing, for example along opposing sides of the glazing or along two connecting sides of the glazing.

The graded transmission may go from dark to light extending away from peripheral edge of the glazing or vice versa.

Figure 16:
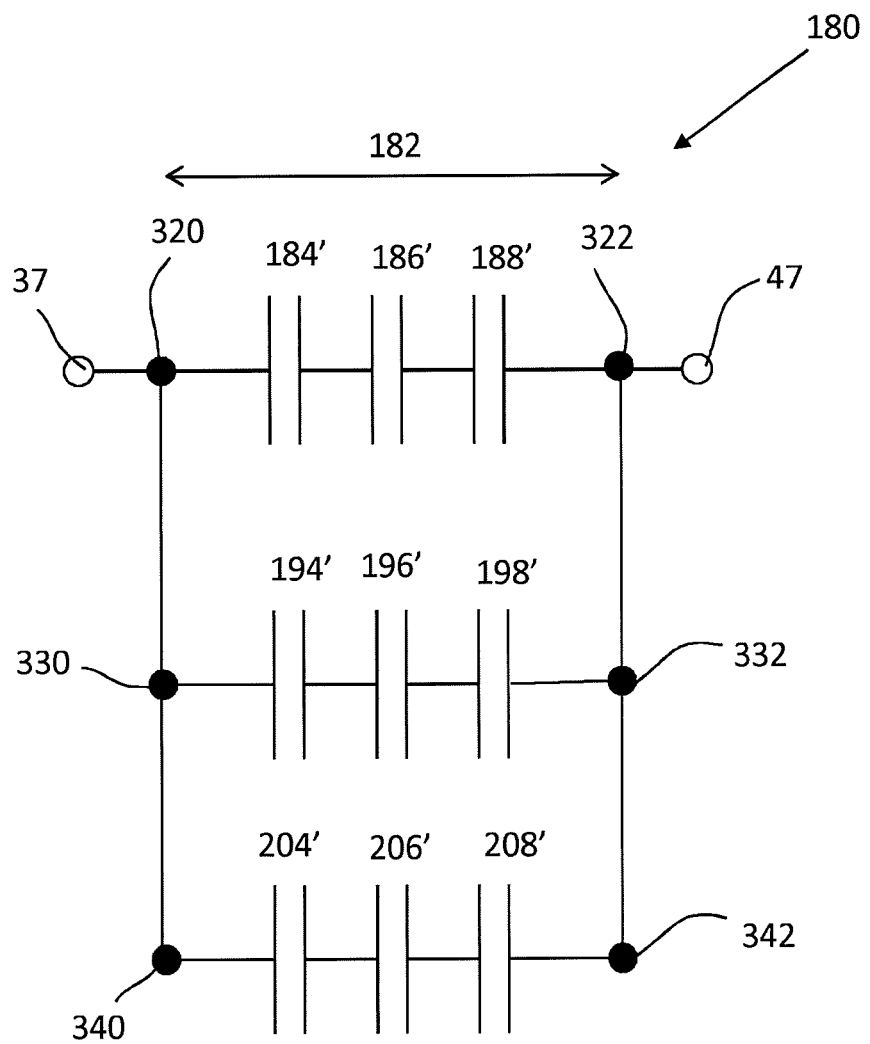
FIG. 16 shows a circuit diagram representing another switchable device in accordance with the present invention.

FIG. 16 shows a circuit diagram representation of another switchable device 180. The switchable device 180 is similar to the switchable device 100 in that there is one branch and three arms. However each arm $I_1^1$, $I_2^1$ and $I_3^1$ has three capacitors electrically connected in series.

In the first arm $I_1^1$ capacitors 184', 186' and 188' are electrically connected in series between nodes 320 and 322. In the second arm $I_2^1$ capacitors 194', 196' and 198' are electrically connected in series between nodes 330 and 332. In the third arm $I_3^1$ capacitors 204', 206' and 208' are electrically connected in series between nodes 340 and 342.

Nodes 320, 330 and 340 have a direct galvanic connection to the first electrical connector region 37. Nodes 322, 332 and 342 have a direct galvanic connection to second electrical connector region 47.

The capacitance of capacitors 184', 194' and 204' are all the same (=4C). The capacitance of capacitors 186', 196' and 206' are all the same (=2C). The capacitance of capacitors 188', 198' and 208' are all the same (=C).

In the switchable device the capacitors shown in FIG. 16 are representative of the capacitance of a strip of SPD film. To achieve the desired capacitance ratio it is possible to cut the strips from a large SPD film (such that the separation of the electrodes is constant) and to ensure the surface area of the strips is in the ratio 4:2:1. A convenient way is to cut the strips of SPD film to have a major surface with a rectangular outline, wherein the length of each strip is the same but the width thereof is chosen to achieve the desired capacitance ratio. It is readily apparent that three strips may be cut having a length L and a width w, three strips are cut having a length L and a width 2w, and three strips are cut having a length L and a width 4w.

Unlike the switchable device 100, the capacitance of the strips of SPD film used in each arm are not all the same. In each arm, there are three strips of SPD film electrically connected in series where the first strip has a surface area twice that of the second strip, and the third strip has a surface area half that of the second strip. As a result, the capacitance of the strips of SPD film in the first arm are 4C, 2C and C. The second and third arms are configured in the same way.

Figure 17:
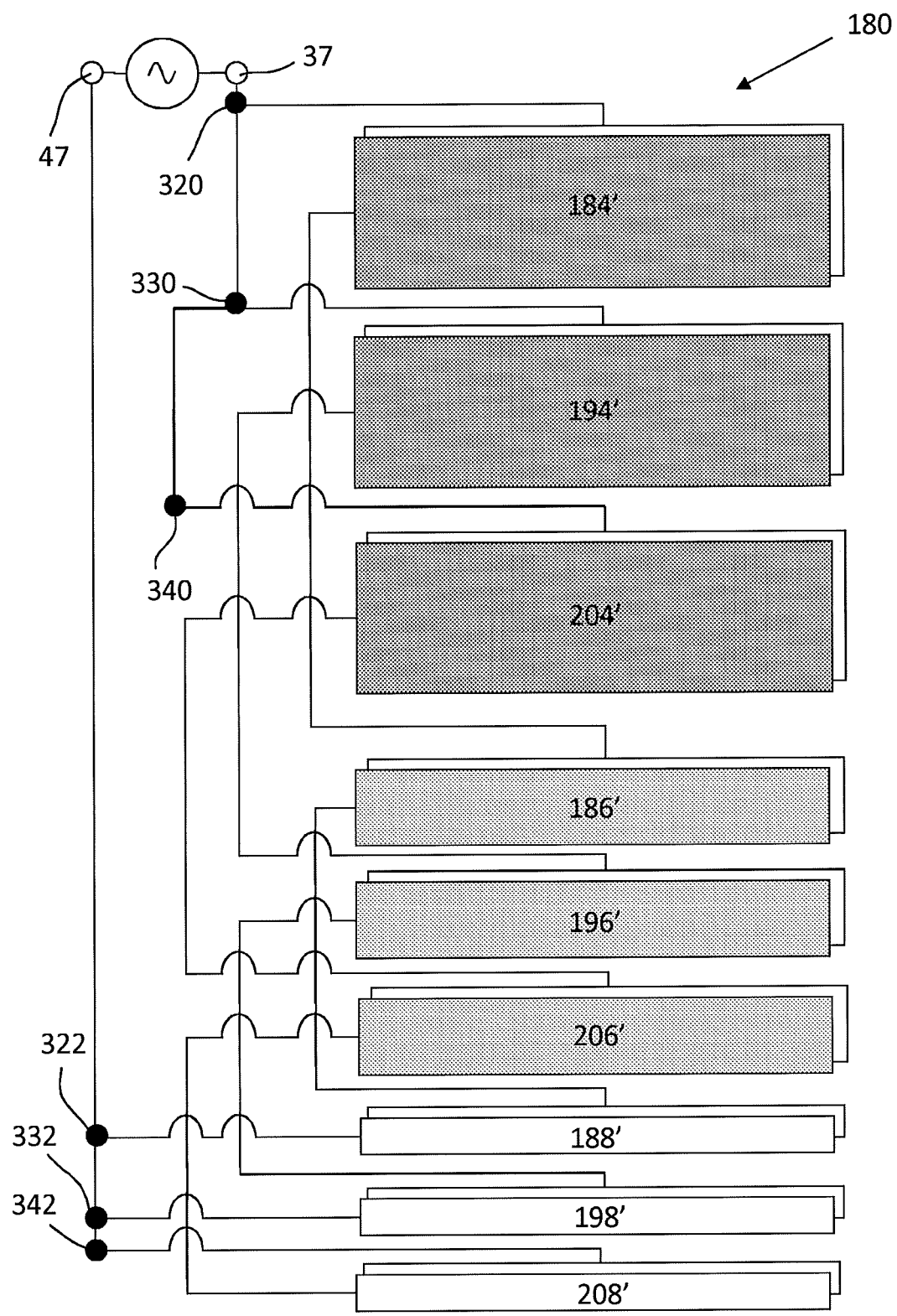
FIG. 17 shows another switchable device in accordance with the present invention, the circuit diagram representation of which is shown in FIG. 16.

The switchable device 180 is shown in FIG. 17 and is configured such that the strips of SPD film having an area 4Lw are grouped together, the strips of SPD film having an area 2Lw are grouped together and the strips of SPD film having an area Lw are grouped together. The result is a switchable device 180 that, when electrical connector regions 37, 47 are connected to a suitable power supply, the switchable device has in a first direction greater opacity, then medium opacity, and then least opacity. This is shown in FIG. 17 where the switchable device 180 is shown arranged as part of a glazing. For clarity the glazing is not shown but the switchable device 180 may be positioned near a peripheral edge of the glazing with the major surface of each switchable region facing the major surface of the glazing (for example as shown in FIG. 13).

As FIG. 17 shows, even though the switchable regions in each arm are electrically connected in series, the spatial arrangement of the switchable regions is such that switchable regions in each arm having the same capacitance are grouped together.

Figure 18:
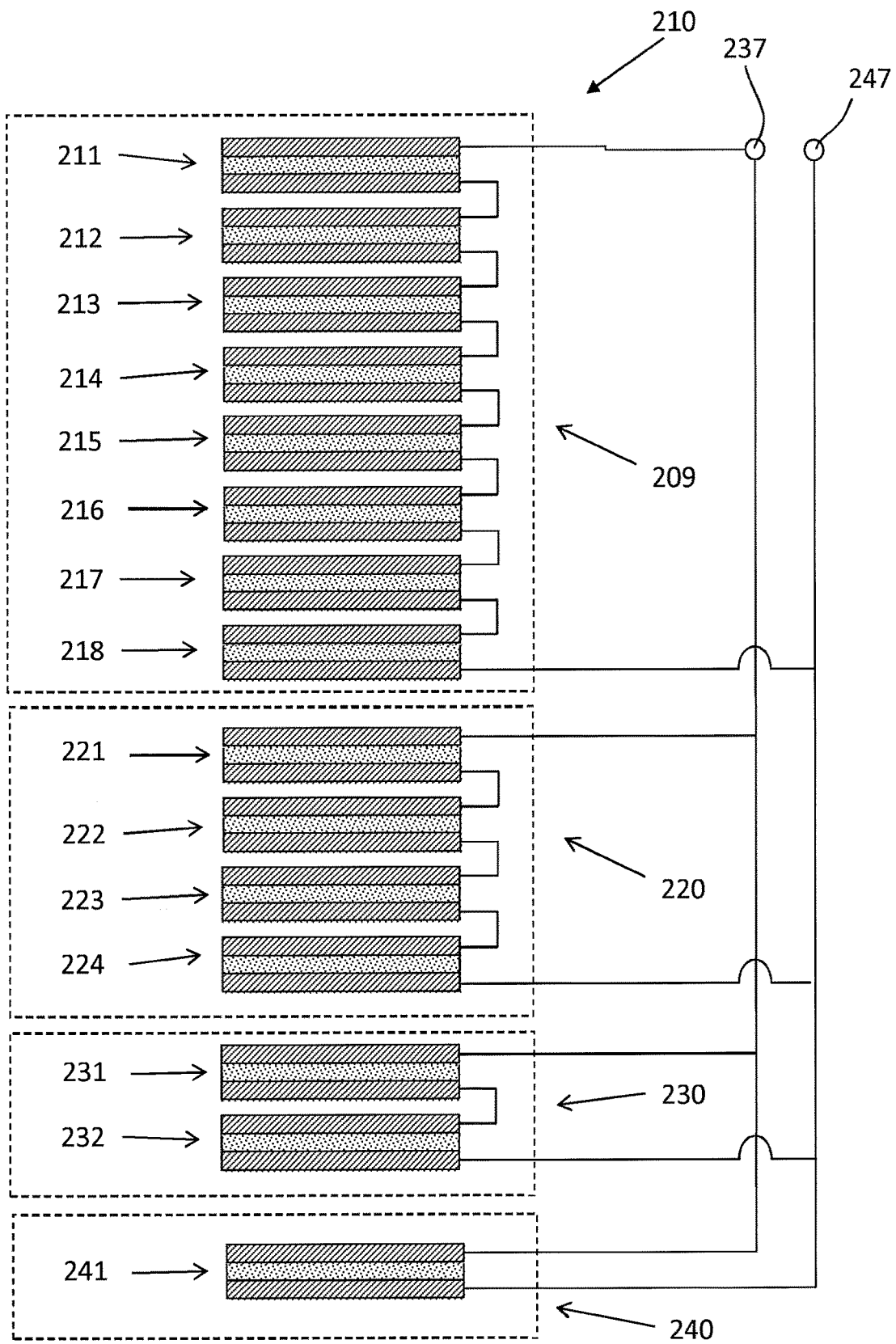
FIG. 18 shows another switchable device in accordance with the present invention.

FIG. 18 shows another switchable device 210. The switchable device 210 comprises one branch having four arms 209, 220, 230 and 240.

In the first arm 209 there are eight switchable regions 211, 212, 213, 214, 215, 216, 217 and 218 electrically connected in series. In the second arm 220 there are four switchable regions 221, 222, 223 and 224 electrically connected in series. In the third arm 230 there are two switchable regions 231 and 232 electrically connected in series. In the fourth arm 241 there is a single switchable region 241.

Each arm 209, 220, 230 and 240 is connected in parallel across electrical connector regions 237, 247.

Each switchable region in each arm 209, 220, 230 and 240 is a strip of SPD film configured to have the same capacitance.

When a voltage having a sinusoidal waveform at a frequency of 50 Hz and a magnitude of 160V is applied to the electrical connector regions 237, 247, a voltage of 20V is across each of the switchable regions in the first arm, a voltage of 40V is across each of the switchable regions in the second arm, a voltage of 80V is across each of the switchable regions in the third arm and a voltage of 160V is across the switchable region in the fourth arm. With reference to FIG. 2, the switchable regions in the first arm will 209 change opacity least, each switchable region having an opacity of about (100−4)=96%. The switchable regions in the second arm 220 will have an opacity of about (100−18)=82%. The switchable regions in the third arm 230 will have an opacity of about (100−44)=56% and the opacity of the switchable region in the fourth arm 240 will have the lowest opacity i.e. about (100−51)=49%.

When the strips of SPD film have the same spatial arrangement as shown in FIG. 18, a region of graded transmission is obtained upon connecting the electrical connector regions 237, 247 of switchable device 210 to a suitable power supply.

When no power supply is connected to the electrical connector regions 237, 247 the strips of SPD film are switched off and have the maximum opacity (about 99%, see FIG. 2). Reference is made to FIG. 2 to determine the voltage required to switch all the switchable regions on. A voltage of at least 120V across each switchable region is required to switch the opacity from the highest to the lowest value.

Figure 19:
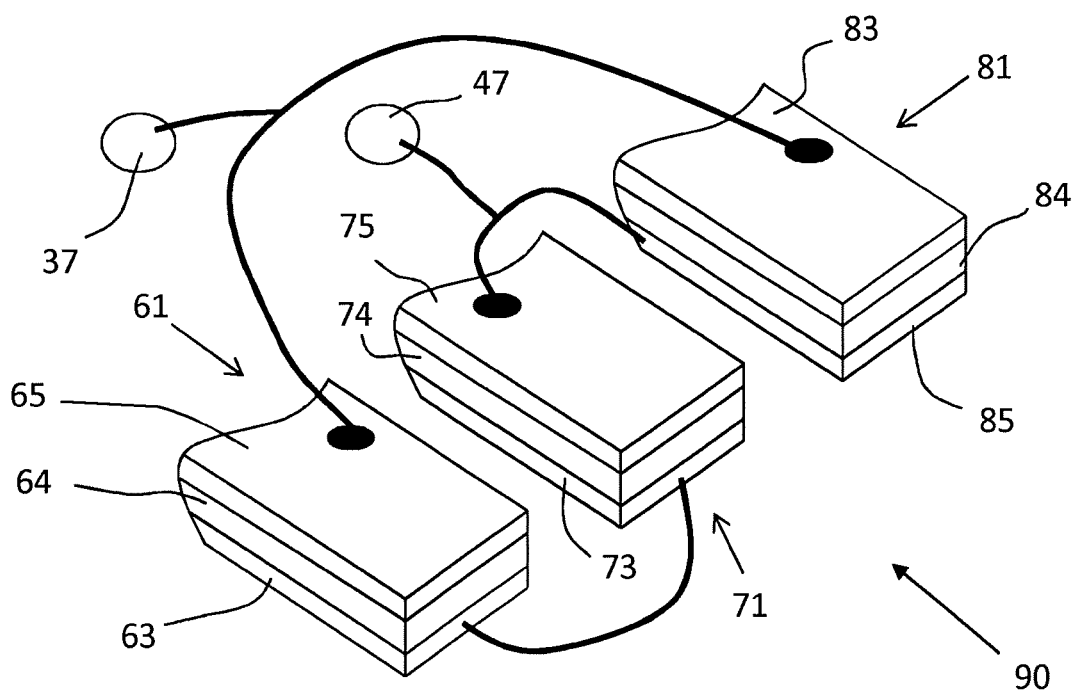
FIG. 19 shows an isometric perspective representation of the switchable device shown in FIG. 9.

FIG. 19 shows a perspective representation of part of the switchable device 90 shown in FIG. 9.

In relation to the orientation shown in FIG. 19, each strip of SPD film 61, 71, 81 comprises an upper electrode and a lower electrode. With reference to FIG. 9 and the associated description thereof, the upper electrode of strip of SPD film 61 corresponds to the second electrode 65 and the lower electrode of the strip of SPD film 61 corresponds to the first electrode 63. Between the upper and lower electrodes is a layer 64 comprising the suspended particles. The upper electrode of strip of SPD film 71 corresponds to the second electrode 75 and the lower electrode of the strip of SPD film 71 corresponds to the first electrode 73. Between the upper and lower electrodes is a layer 74 comprising the suspended particles. The upper electrode of strip of SPD film 81 corresponds to the first electrode 83 and the lower electrode of the strip of SPD film 81 corresponds to the second electrode 85. Between the upper and lower electrodes is a layer 84 comprising the suspended particles.

The electrodes 65, 83 are in electrical communication with the first electrical connector region 37. An electrical connection to the electrodes 65, 83 may be a direct galvanic connection to the ITO coating of the respective electrode or may be a capacitive connection to the ITO coating of the respective electrode. A direct galvanic electrical connection between the electrodes 65, 83 may be by any suitable electrical connector means.

There is a direct galvanic connection between electrode 63 and electrode 73. There is a direct galvanic connection between electrode 75 and electrode 85. Electrodes 75, 85 are in electrical communication with the second electrical connector region 47.

Figure 20:
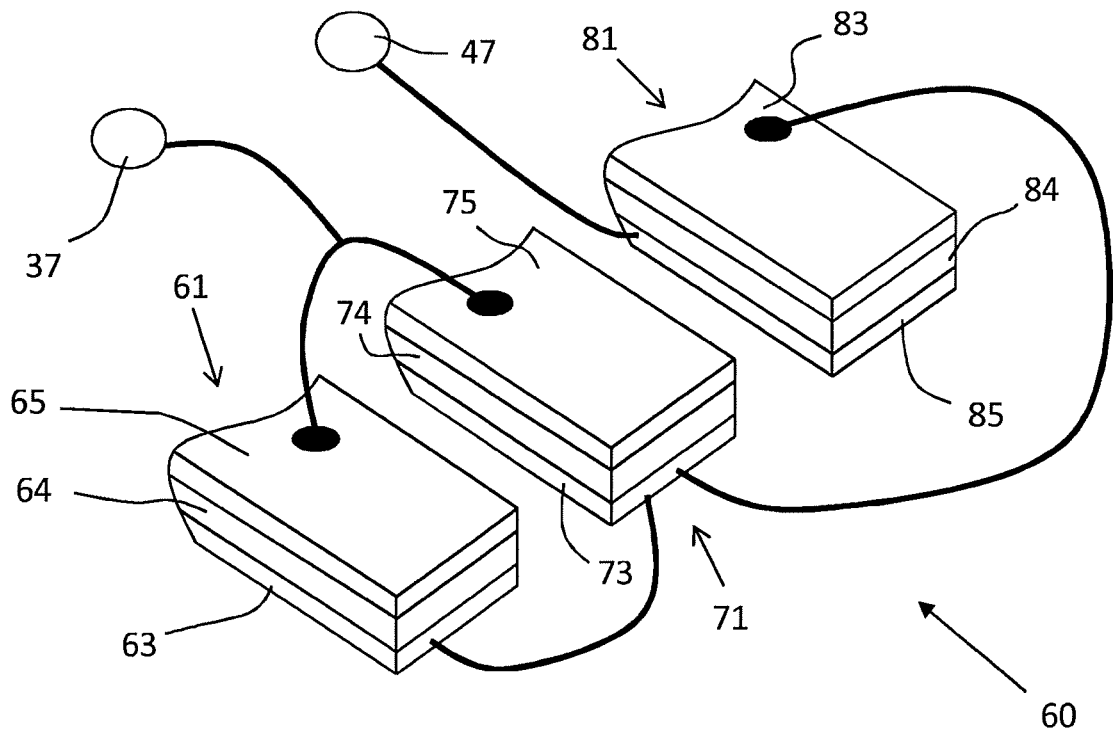
FIG. 20 shows an isometric perspective representation of the switchable device shown in FIG. 7.

FIG. 20 shows a perspective representation of part of the switchable device 60 shown in FIG. 7.

In relation to the orientation shown in FIG. 20, each strip of SPD film 61, 71, 81 comprises an upper electrode and a lower electrode. With reference to FIG. 7 and the associated description thereof, the upper electrode of strip of SPD film 61 corresponds to the second electrode 65 and the lower electrode of the strip of SPD film 61 corresponds to the first electrode 63. Between the upper and lower electrodes is a layer 64 comprising the suspended particles. The upper electrode of strip of SPD film 71 corresponds to the second electrode 75 and the lower electrode of the strip of SPD film 71 corresponds to the first electrode 73. Between the upper and lower electrodes is a layer 74 comprising the suspended particles. The upper electrode of strip of SPD film 81 corresponds to the first electrode 83 and the lower electrode of the strip of SPD film 81 corresponds to the second electrode 85. Between the upper and lower electrodes is a layer 84 comprising the suspended particles.

The electrodes 65, 75 are in electrical communication with the first electrical connector region 37. An electrical connection to the electrodes 65, 75 may be a direct galvanic connection to the ITO coating of the respective electrode or may be a capacitive connection to the ITO coating of the respective electrode. A direct galvanic electrical connection between the electrodes 65, 75 may be by any suitable electrical connector means.

There is a direct galvanic connection between electrode 63 and electrode 73. There is a direct galvanic connection between electrode 73 and electrode 83. Electrode 85 is in electrical communication with the second electrical connector region 47.

Figure 21:
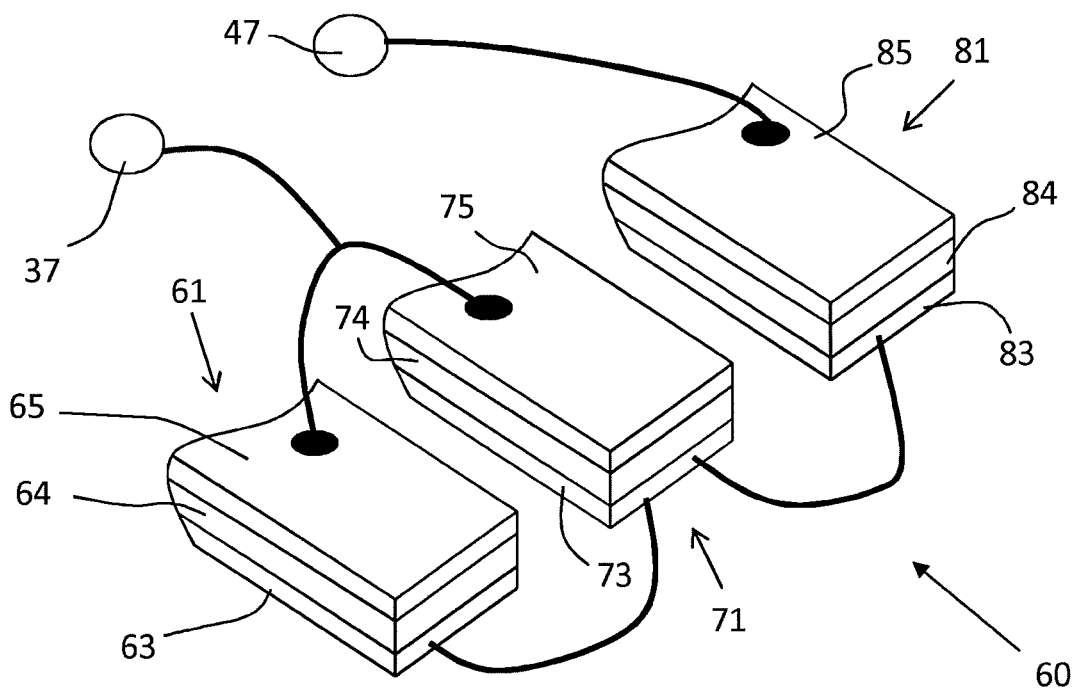
FIG. 21 shows an isometric perspective representation of an alternative configuration of the switchable device shown in FIG. 7.

In an alternative arrangement to FIG. 20, FIG. 21 shows the switchable device 60 of FIG. 7 where the strip of SPD film 81 is inverted relative to the orientation shown in FIG. 20 such that the upper electrode of the strip of SPD film 81 corresponds to electrode 85 and the lower electrode of the SPD film 81 corresponds to electrode 83. It is possible to invert the strip of SPD film 81 in this way because the SPD film 81 is isotropic. Where possible it may be desirable to invert the SPD film such that it is easier to electrically connect two electrodes of two such SPD films.

Figure 22:
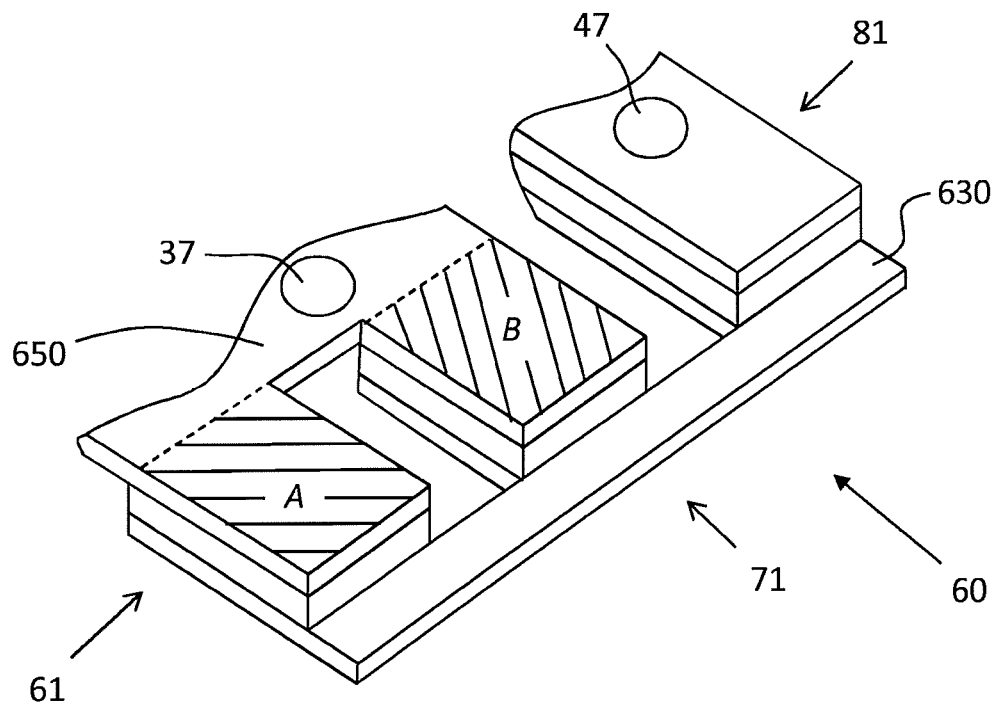
FIG. 22 shows an alternative way of constructing the switchable device shown in FIG. 7.

FIG. 22 shows an alternative way of constructing the switchable device 60 shown in FIG. 7.

A single sheet of SPD film has been cut to produce three separately switchable regions 61, 71 and 81 therein. The switchable region 61 is only switchable up to the dotted line (region A). The switchable region 71 is only switchable up to the dotted line (region B). The original SPD film has been cut such that all three switchable regions 61, 71, 81 share a common lower electrode 630 such that no additional electrical connections are required to the lower electrodes.

The original SPD film has been cut such that the switchable regions 61, 71 share a common upper electrode 650. The common upper electrode 650 is in electrical communication with the first electrical connector region 37 that is on the common upper electrode. The first electrical connector region 37 may be part of the ITO coating of the common upper electrode 650. Alternatively the first electrical connector region 37 may be an electrically conductive region on the upper PET sheet that capacitively couples to the ITO coating on said PET sheet.

The second electrical connector region is on the upper electrode of the switchable region 81. The second electrical connector region 47 may be part of the ITO coating of the upper electrode of switchable region 81. Alternatively the first electrical connector region may be an electrically conductive region on the upper PET sheet that capacitively couples to the ITO coating on the PET sheet of the upper electrode of the switchable region 81.

Even though the switchable regions 61, 71 and 81 are in mechanical communication, each switchable region is electrically connected to provide a switchable device in accordance with the present invention.

FIG. 23 shows an SPD film 1 (as described with reference to FIG. 1) having a first electrical connector region 37 in direct electrical communication with the ITO coating 9, that is, there is a direct galvanic connection with ITO coating 9. A portion 2 of the SPD film 1 has been removed (shown in phantom) to expose the ITO coating 9. Contact adhesive or the like may be used to make a direct galvanic connection to the ITO coating 9. A similar connection 47 (shown in phantom) may be made to the ITO coating 7. Electrical conductors such as copper wire, electrically conductive tape or the like may extend from the electrical connector region 37 (and/or 47) for electrical connection to other electrical components.

The first electrical connector region 37 is on the electrode 15 and the second electrical connector 47 is on the electrode 13.

FIG. 24 shows an SPD film 1 (as described with reference to FIG. 1) having a first electrical connector region 37' in electrical communication with ITO coating 7 and a second electrical connector region 47' in electrical communication with the ITO coating 9. The first electrical connector region 37' is on the electrode 13 and the second electrical connector region 47' is on the electrode 15.

The first electrical connector region 37' is able to capacitively couple with the ITO coating 7 and the second electrical connector is able to capacitively couple with the ITO coating 9 such that the opacity of layer 11 is able to change upon connecting the first and second electrical connector regions 37', 47' to a suitable power supply. Copper wire or the like may extend from the electrical connector region 37' (and/or 47') for electrical connection to other electrical components.

The electrical connector regions 37', 47' shown in FIG. 24 may be referred to as remote electrical connections, as described in WO2010/032070A1, in particular at page 9 line 28 to page 10 line 5 of WO2010/032070A1 as published.

Figure 25:
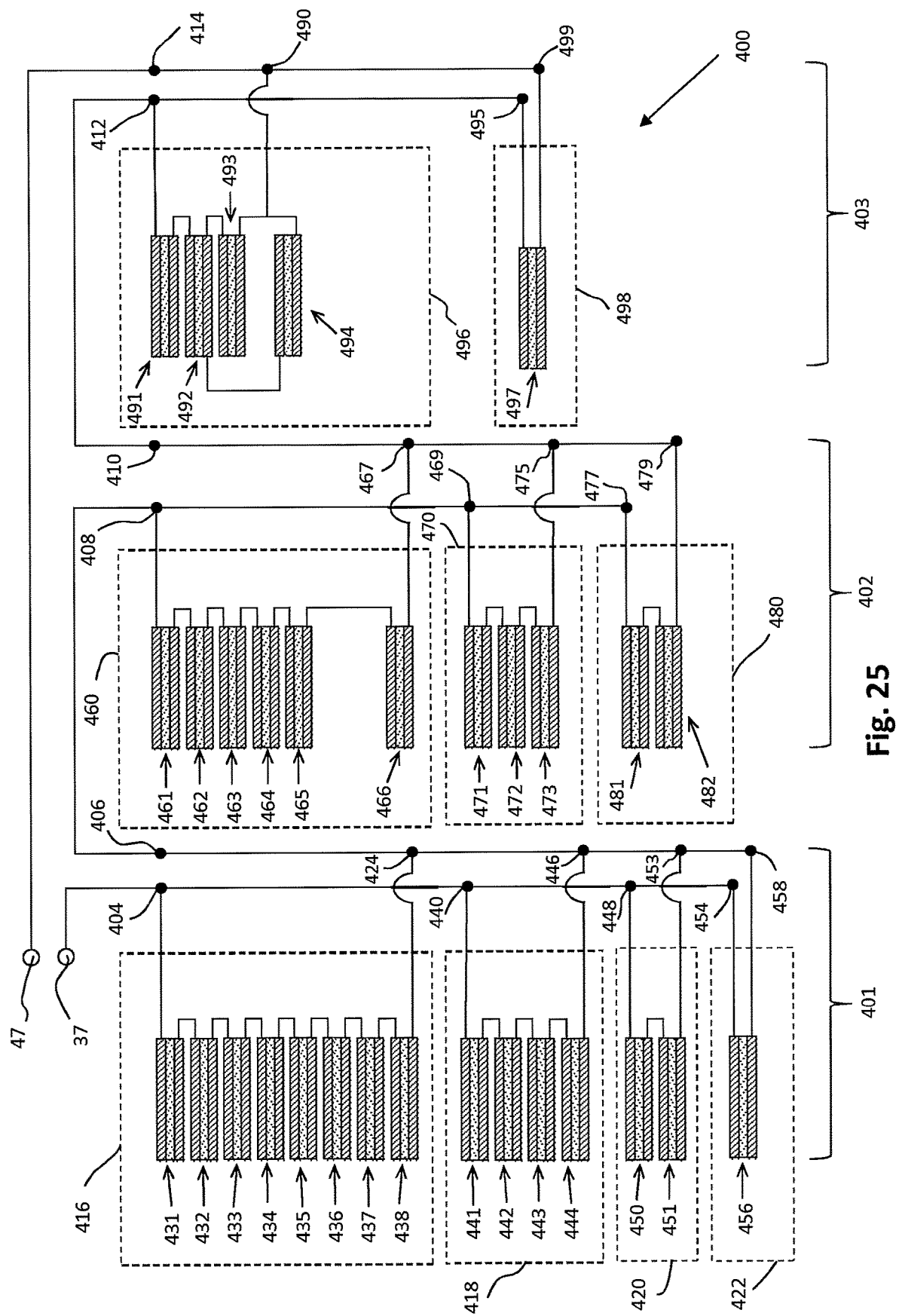
FIG. 25 shows another switchable device according to the present invention.

FIG. 25 shows another switchable device 400 having three branches 401, 402 and 403. In the first branch 401 there are four arms 416, 418, 420 and 422. In the second branch 402 there are three arms 460, 470 and 480. In the third branch 403 there are two arms 496 and 498.

The branch 401 is between nodes 404 and 424. The branch 402 is between nodes 406 and 467. The branch 403 is between nodes 410 and 414.

Node 404 is in direct electrical communication with first electrical connector region 37. Node 424 is in direct electrical communication with node 406. Node 467 is in direct electrical communication with node 410. Node 414 is in direct electrical communication with second electrical connector region 47.

Figure 26:
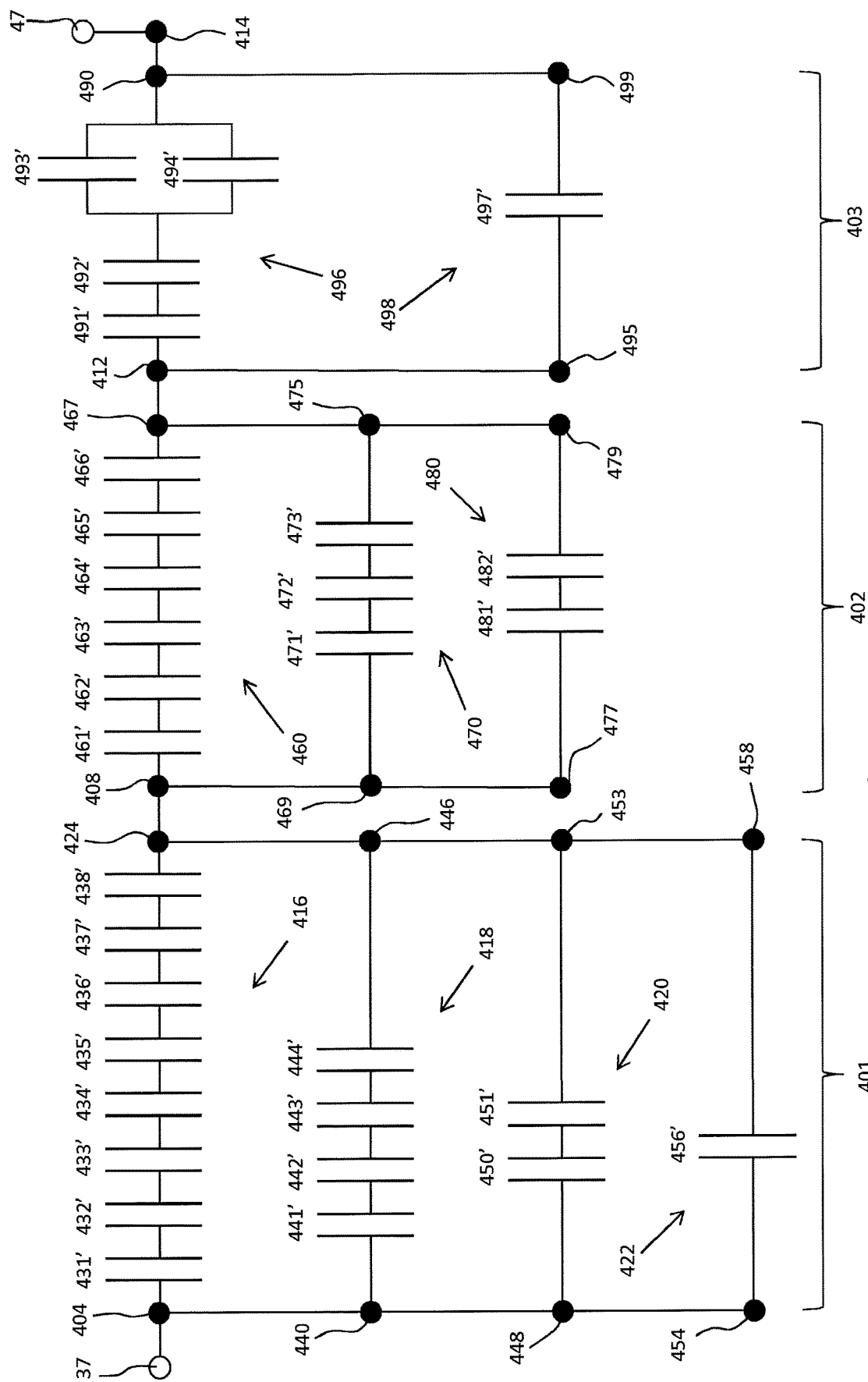
FIG. 26 shows a circuit diagram representation of the switchable device shown in FIG. 25.

FIG. 26 shows a circuit diagram representation of the switchable device 400 with each strip of SPD film in each arm of each branch being represented by a capacitor. For example the strip of SPD film 431 in FIG. 25 is represented by capacitor 431' in FIG. 26, the strip of SPD film 432 in FIG. 25 is represented by capacitor 432', and so on.

The switchable device 400 is described in more detail with reference to FIG. 25 and FIG. 26.

In each arm 416, 418, 420, 422, 460, 470, 480, 496 and 498 there is at least one strip of SPD film of the type described in relation to FIG. 1, each strip of SPD film having a first (upper) and a second (lower) electrode, between which is a variable opacity layer comprising the suspended particles. For clarity each respective upper and lower electrode and variable opacity layer is not labelled in FIG. 25, and in the same way as in FIG. 11, each strip of SPD film is shown in cross section and only the electrically conductive ITO coatings of the respective electrodes are shown. Each strip of SPD film in each arm is configured to have the same capacitance (=C). For example, each strip of SPD film has the same major surface area, i.e. 2 cm wide by 50 cm long, each having been cut from the same "mother sheet".

Arm 416 of branch 401 has eight strips of SPD film 431, 432, 433, 434, 435, 436, 437 and 438 electrically connected in series between nodes 404 and 424. The upper electrode of SPD film 431 is in electrical communication with the node 404 and the lower electrode of SPD film 438 is in electrical communication with the node 424. In this specific example, adjacent strips of SPD film are electrically connected in series such that for two adjacent strips, the lower electrode of one strip is electrically connected to the upper electrode of the other strip. For example, the lower electrode of strip of SPD film 431 is electrically connected to the upper electrode of the strip of SPD film 432. It may be desirable to electrically connect the strips of SPD film in series such that the upper electrode of one strip of SPD film is connected to the upper electrode of an adjacent strip of SPD film. This is possible because the strip of SPD film is isotropic, as has been discussed in relation to FIG. 21.

For the avoidance of doubt the electrical connection of arm 416 is described in more detail. The lower electrode of strip of SPD film 431 is in electrical communication with the upper electrode of the strip of SPD film 432. In this example, there is a direct galvanic connection between the lower electrode of strip of SPD film 431 and the upper electrode of the strip of SPD film 432.

The lower electrode of strip of SPD film 432 is in electrical communication with the upper electrode of the strip of SPD film 433. In this example, there is a direct galvanic connection between the lower electrode of strip of SPD film 432 and the upper electrode of the strip of SPD film 433.

The lower electrode of strip of SPD film 433 is in electrical communication with the upper electrode of the strip of SPD film 434. In this example, there is a direct galvanic connection between the lower electrode of strip of SPD film 433 and the upper electrode of the strip of SPD film 434.

The lower electrode of strip of SPD film 434 is in electrical communication with the upper electrode of the strip of SPD film 435. In this example, there is a direct galvanic connection between the lower electrode of strip of SPD film 434 and the upper electrode of the strip of SPD film 435.

The lower electrode of strip of SPD film 435 is in electrical communication with the upper electrode of the strip of SPD film 436. In this example, there is a direct galvanic connection between the lower electrode of strip of SPD film 435 and the upper electrode of the strip of SPD film 436.

The lower electrode of strip of SPD film 436 is in electrical communication with the upper electrode of the strip of SPD film 437. In this example, there is a direct galvanic connection between the lower electrode of strip of SPD film 436 and the upper electrode of the strip of SPD film 437.

The lower electrode of strip of SPD film 437 is in electrical communication with the upper electrode of the strip of SPD film 438. In this example, there is a direct galvanic connection between the lower electrode of strip of SPD film 437 and the upper electrode of the strip of SPD film 438.

Arm 418 of branch 401 has four strips of SPD film 441, 442, 443 and 444 electrically connected in series between two nodes 440 and 446. The upper electrode of SPD film 441 is in electrical communication with the node 440 and the lower electrode of SPD film 444 is in electrical communication with the node 446. The node 440 is in direct electrical communication with the node 404 and the node 446 is in direct electrical communication with the node 424.

The upper electrode of strip of SPD film 441 has a direct galvanic connection to node 440.

The lower electrode of strip of SPD film 441 is in electrical communication with the upper electrode of the strip of SPD film 442. In this example, there is a direct galvanic connection between the lower electrode of strip of SPD film 441 and the upper electrode of the strip of SPD film 442.

The lower electrode of strip of SPD film 442 is in electrical communication with the upper electrode of the strip of SPD film 443. In this example, there is a direct galvanic connection between the lower electrode of strip of SPD film 442 and the upper electrode of the strip of SPD film 443.

The lower electrode of strip of SPD film 443 is in electrical communication with the upper electrode of the strip of SPD film 444. In this example, there is a direct galvanic connection between the lower electrode of strip of SPD film 443 and the upper electrode of the strip of SPD film 444.

The lower electrode of strip of SPD film 444 has a direct galvanic connection to node 446.

Arm 420 of branch 401 has two strips of SPD film 450, 451 electrically connected in series between two nodes 448 and 453. The upper electrode of SPD film 450 is in electrical communication with the node 448 and the lower electrode of SPD film 451 is in electrical communication with the node 453. The node 448 is in direct electrical communication with the node 440 (and hence node 404) and the node 453 is in direct electrical communication with the node 446 (and hence node 424).

The lower electrode of strip of SPD film 450 is in electrical communication with the upper electrode of the strip of SPD film 451. In this example, there is a direct galvanic connection between the lower electrode of strip of SPD film 450 and the upper electrode of the strip of SPD film 451.

The lower electrode of strip of SPD film 451 has a direct galvanic connection to node 453 and the upper electrode of strip of SPD film 450 has a direct galvanic connection to node 448.

Arm 422 of branch 401 has a single strip of SPD film 456 electrically connected between nodes 458 and 454. The upper electrode of SPD film 456 is in electrical communication with node 454 and the lower electrode of SPD film 456 is in electrical communication with node 458. The node 454 is in direct electrical communication with the node 448 (and hence nodes 440, 404) and the node 458 is in direct electrical communication with the node 453 (and hence nodes 446, 424).

The lower electrode of strip of SPD film 456 has a direct galvanic connection to node 458 and the upper electrode of strip of SPD film 456 has a direct galvanic connection to node 454.

Arm 460 of branch 402 has six strips of SPD film 461, 462, 463, 464, 465 and 466 electrically connected in series between nodes 408 and 467. The upper electrode of SPD film 461 is in electrical communication with the node 408 and the lower electrode of SPD film 466 is in electrical communication with the node 467. Node 408 is in direct electrical communication with node 406 and node 467 is in direct electrical communication with node 410.

Arm 470 of branch 402 has three strips of SPD film 471, 472 and 473 electrically connected in series between nodes 469 and 475. The upper electrode of SPD film 471 is in electrical communication with node 469 and the lower electrode of SPD film 473 is in electrical communication with node 475. The node 469 is in direct electrical communication with the node 408 and the node 475 is in direct electrical communication with the node 467.

Arm 480 of branch 402 has two strips of SPD film 481 and 482 electrically connected in series between nodes 477 and 479. The upper electrode of SPD film 481 is in electrical communication with node 477 and the lower electrode of SPD film 482 is in electrical communication with node 479. The node 477 is in direct electrical communication with the node 469 (and hence node 408) and the node 479 is in direct electrical communication with the node 475 (and hence node 467).

The arm 496 of branch 403 has strip of SPD film 491 electrically connected in series with strip of SPD film 492. The upper electrode of SPD film 491 is in electrical communication with the node 412 and the lower electrode of SPD film 491 is in electrical communication with the upper electrode of strip of SPD film 492. The node 412 is in direct electrical communication with node 410.

Between the lower electrode of the SPD film 492 and the node 490 are two strips of SPD film 493, 494 are electrically connected in parallel. The lower electrode of strips of SPD films 493, 494 are in electrical communication with the node 490. The upper electrode of strips of SPD films 493, 494 are in electrical communication with the lower electrode of strip of SPD film 492.

Arm 498 of branch 403 has a single strip of SPD film 497 between nodes 495 and 499. The upper electrode of strip of SPD film 497 is in electrical communication with the node 495 and the lower electrode of the strip of SPD film 497 is in electrical communication with the node 499. The node 495 is in direct electrical communication with node 412 and the node 499 is in direct electrical communication with the node 490. Node 490 is in direct electrical communication with node 414.

In accordance with equations (1) to (9), the switchable device 400 has three branches i.e. B=3. The switchable device 400 can then be represented by equation (6), $S_D=B_1+B_2+B_3$ where $B_1\equiv$branch 401, $B_2\equiv$branch 402 and $B_3\equiv$branch 403.

In branch $B_1$ there are four arms so in accordance with equation (4), $B_1=I_1^1+I_2^1+I_3^1+I_4^1$, where $I_1^1\equiv$arm 416, $I_2^1\equiv$arm 418, $I_3^1\equiv$arm 420 and $I_4^1\equiv$arm 422. As can be seen, there are fifteen switchable regions in branch $B_1$, eleven switchable regions in $B_2$ and five switchable regions in branch $B_3$.

In branch $B_2$ there are three arms so in accordance with equation (4), $B_2=I_1^2+I_2^2+I_3^2$, where $I_1^2\equiv$arm 460, $I_2^2\equiv$arm 470 and $I_3^2\equiv$arm 480.

In branch $B_3$ there are two arms so in accordance with equation (4), $B_3=I_1^3+I_2^3$, where $I_1^3\equiv$arm 496 and $I_2^1\equiv$arm 498.

In arm $I_1^1$ there are eight strips of SPD film electrically connected in series and zero strips of SPD film electrically connected in parallel. In accordance with equation (5), $I_1^1={}^1s_1^1+{}^1s_2^1+{}^1s_3^1+{}^1s_4^1+{}^1s_5^1+{}^1s_6^1+{}^1s_7^1+{}^1s_8^1$. where ${}^1s_1^1\equiv$SPD film 431, ${}^1s_2^1\equiv$SPD film 432, ${}^1s_3^1\equiv$SPD film 433, ${}^1s_4^1\equiv$SPD film 434, ${}^1s_5^1\equiv$SPD film 435, ${}^1s_6^1\equiv$SPD film 436, ${}^1s_7^1\equiv$SPD film 437 and ${}^1s_8^1\equiv$SPD film 438.

Similarly, arm $I_2^1={}^1s_1^2+{}^1s_2^2+{}^1s_3^2+{}^1s_4^2$ where ${}^1s_1^2\equiv$SPD film 441, ${}^1s_2^2\equiv$SPD film 442, ${}^1s_3^2\equiv$SPD film 443 and ${}^1s_4^2\equiv$SPD film 444.

Similarly, arm $I_3^1={}^1s_1^3+{}^1s_2^3$ where ${}^1s_1^3\equiv$SPD film 450 and ${}^1s_2^3\equiv$SPD film 451.

Arm $I_4^1={}^1s_1^4$ where ${}^1s_1^4\equiv$SPD film 456.

In arm $I_1^2$ there are six strips of SPD film electrically connected in series and zero strips of SPD film electrically connected in parallel. In accordance with equation (5), $I_1^2={}^2s_1^1+{}^2s_2^1+{}^2s_3^1+{}^2s_4^1+{}^2s_5^1+{}^2s_6^1$. where ${}^2s_1^1\equiv$SPD film 461, ${}^2s_2^1\equiv$SPD film 462, ${}^2s_3^1\equiv$SPD film 463, ${}^2s_4^1\equiv$SPD film 464, ${}^2s_5^1\equiv$SPD film 465 and ${}^2s_6^1\equiv$SPD film 466. Similarly, arm $I_2^2={}^2s_1^2+{}^2s_2^2+{}^2s_3^2$ where ${}^2s_1^2\equiv$SPD film 471, ${}^2s_2^2\equiv$SPD film 472 and ${}^2s_3^2\equiv$SPD film 473.

Similarly, arm $I_3^2={}^2s_1^3+{}^2s_2^3$ where ${}^2s_1^3\equiv$SPD film 481 and ${}^2s_2^3\equiv$SPD film 482.

In arm $I_1^3$ there are two strips of SPD film electrically connected in series and two strips of SPD film electrically connected in parallel. In accordance with equation (5), $I_1^3={}^3s_1^1+{}^3s_2^1+{}^3p_1^1+{}^3p_2^1$ where ${}^3s_1^1\equiv$SPD film 491, ${}^3s_2^1\equiv$SPD film 492, ${}^3p_1^1\equiv$SPD film 493 and ${}^3p_2^1\equiv$SPD film 494.

Arm $I_2^3={}^3s_1^2$ where ${}^3s_1^2\equiv$SPD film 497.

With reference to FIG. 26, arm 416 is represented by eight capacitors 431', 432', 432', 434', 435', 436', 437' and 438' electrically connected in series between nodes 404 and 424. Arm 418 is represented by four capacitors 441', 442', 443' and 444' electrically connected in series between nodes 440 and 446. Arm 420 is represented by two capacitors 450' and 451' electrically connected in series between nodes 448 and 453. Arm 422 is represented by capacitor 456' between nodes 454 and 458. Arm 460 is represented by six capacitors 461', 462', 463', 464', 465' and 466' electrically connected in series between nodes 408 and 467. Arm 470 is represented by three capacitors 471', 472' and 473' electrically connected in series between nodes 469 and 475. Arm 480 is represented by two capacitors 481' and 482' electrically connected in series between nodes 477 and 479. Arm 496 is represented by a capacitor network between nodes 412 and 490, the capacitor network consisting of two capacitors 491' and 492' electrically connected in series followed by two capacitors 493' and 494' electrically connected in parallel. Arm 498 is represented by capacitor 497' between nodes 495 and 499.

The switchable device 400 has only a single pair of electrical connector regions 37 and 47. However it will be readily apparent the switchable device may have additional electrical connector regions. For example, a different or one or more power supply may be applied across two different nodes, for example an additional power supply between nodes 408 and 467. However it is preferred for there to be a single pair of electrical connector regions.

In the aforementioned examples, the switchable regions are provided by an SPD film. As is known in the art, the capacitance of a typical SPD film may be around 400-1000 $nF/m^2$. For a strip of such SPD film that is one meter long by one centimeter wide the capacitance is around 4-10 nF. Switching such a film with 120V will change the film from dark to light in accordance with FIG. 2. To obtain a light transmission through the film of around 35%, the magnitude of the voltage across the film is needed to be about 60V.

A switchable device in accordance with the present invention finds particular application as a component part of a glazing where a portion of the glazing is desired to have at least two manually operable switchable region of variable opacity. The present invention provides a switchable device that may have a manually operable change in opacity upon connecting a single pair of electrical connector regions to a suitable power supply. Typical glazings include vehicle glazing including automotive glazings such as windscreens, side windows, sunroof, moon roofs and backlights and glazings for ships and airplanes. Typical glazings also include glazings for buildings such as windows and interior partitions. The switchable device may also be used as part of a visor or goggles.

The invention claimed is:

1. A glazing comprising a first sheet of glazing material spaced apart from a second sheet of glazing material and a switchable device for changing the opacity of at least a portion of a glazing, the switchable device being positioned between the first sheet of glazing material and the second sheet of glazing material, the first sheet of glazing material having a major surface and the switchable device being bonded to the major surface of the first sheet of glazing material by an interlayer structure comprising at least one sheet of adhesive interlayer material, the first sheet of glazing material being glass or plastic, the second sheet of glazing material being glass or plastic, wherein the switchable device comprises at least two (a first and a second) serially electrically connected switchable regions in electrical communication with at least two (a first and a second) electrical connector regions, each switchable region being a respective strip of SPD film (a first strip of SPD film and a second strip of SPD film) having a respective major surface and comprising a respective physically separate electrically actuated variable opacity layer comprising suspended particles between a first electrode and a second electrode, the first switchable region being arranged relative to the second switchable region such that the major surface of each strip of SPD film faces a different portion of the major surface of the first sheet of glazing material, and wherein upon electrical energization of the first and second electrical connector regions, the opacity of the first and second switchable region changes such that at least two (a first and a second) portions of the switchable device have a change of opacity, the first portion of the switchable device having a different opacity to the second portion of the switchable device, wherein the first electrical connector region is in electrical communication with the first electrode of the first switchable region, and the second electrode of the first switchable region is physically separate from and in electrical communication with the first electrode of the second switchable region, and the second electrode of the second switchable region is in electrical communication with the second electrical connector region.

2. A glazing according to claim 1, wherein the first switchable region has a first capacitance and the second switchable region has a second capacitance different to the first capacitance.

3. A glazing according to claim 1, wherein the first electrode of the first and second switchable regions has a major surface, and the area of the major surface of the first electrode of the first switchable region is different to the area of the major surface of the first electrode of the second switchable region.

4. A glazing according to claim 1, wherein there is a direct galvanic connection between the second electrode of the first switchable region and the first electrode of the second switchable region.

5. A glazing according to claim 1, wherein there is a direct galvanic connection between the first electrical connector region and the first electrode of the first switchable region and/or wherein there is a direct galvanic connection between the second electrode of the second switchable region and the second electrical connector region.

6. A glazing according to claim 1, comprising B branches electrically connected in series and in electrical communication with the first and second electrical connector regions, each branch B having two nodes N and M, there being one node at each end of each respective branch, node N being in electrical communication with the first electrical connector region and node M being in electrical communication with the second electrical connector region, wherein each branch has one or more arm I, each arm being in electrical communication with the nodes N, M of the respective branch, further wherein each arm I has s switchable regions connected in series and p switchable regions connected in parallel.

7. A glazing according to claim 1, wherein the opacity of the first and second switchable portions is changeable by electrical energization of only the first and second electrical connector regions.

8. A glazing according to claim 1, wherein the first sheet of glazing material is laminated to the second sheet of glazing material by an interlayer structure between the first and second sheets of glazing material, and wherein the switchable device is part of the interlayer structure.

9. A glazing according to claim 1, wherein the first and second sheets of glazing material are spaced apart by at least one perimeter seal forming a cavity between the first and second sheets of glazing material, and wherein the switchable device is positioned inside the cavity.

10. A glazing according to claim 1, wherein the first and second strips of film are coplanar.

11. A laminated glazing according to claim 1, wherein the at least one sheet of adhesive interlayer material comprises polyvinyl butyral, ethylene vinyl acetate copolymer, polyurethane, poly vinyl chloride or a copolymer of ethylene and methacrylic acid.

12. A glazing according to claim 1, wherein the first switchable region has a first capacitance and the second switchable region has a second capacitance the same or different to the first capacitance,
further wherein the switchable device comprises a third switchable region such that the switchable device comprises at least three switchable regions in electrical communication with the first and second electrical connector regions, the third switchable region being a strip of film having a major surface and comprising an electrically actuated variable opacity layer between a first electrode and a second electrode, the third switchable region having a third capacitance, wherein upon electrical energization of the first and second electrical connector regions, the opacity of the first, second and third switchable regions changes such that at least three (a first, a second and a third) portions of the switchable device have a change of opacity, the third portion of the switchable device having a different opacity to the opacity of the first and second portions.

13. A glazing according to claim 12, wherein the first electrode of the first switchable region is in electrical communication with the first electrical connector region, the first electrode of the second switchable region is in electrical communication with the first electrical connector region and the first electrode of the first switchable region, the second electrode of the first switchable region is in electrical communication with the second electrode of the second switchable region, the first electrode of the third switchable region is in electrical communication with the second electrode of the first switchable region and the second electrode of the second switchable region, and the second electrode of the third switchable region is in electrical communication with the second electrical connector region.

14. A glazing according to claim 12, wherein the first electrode of the first switchable region or the first electrode of second switchable region has a direct galvanic connection with the first electrical connector region or wherein the first electrode of the second switchable region has a direct galvanic connection with the first electrode of the first switchable region or wherein the second electrode of the first switchable region has a direct galvanic connection with the second electrode of the second switchable region or wherein the first electrode of the third switchable region has a direct galvanic connection with the second electrode of the first switchable region.

15. A glazing according to claim 12, wherein the first electrode of the third switchable region has a direct galvanic connection with the second electrode of the second switchable region.

16. A glazing according to claim 12, wherein the second electrode of the third switchable region has a direct galvanic connection with the second electrical connector region.

17. A glazing according to claim 12, wherein the first electrode of the first switchable region is in electrical communication with the first electrical connector region, the first electrode of the second switchable region is in electrical communication with the first electrical connector region, the first electrode of the first switchable region is in electrical communication with the first electrode of the second switchable region, the second electrode of the first switchable region is in electrical communication with the first electrode of the third switchable region, the second electrode of the third switchable region is in electrical communication with the second electrode of the second switchable region, the second electrode of the second switchable region is in electrical communication with the second electrical connector region, and the second electrode of the third switchable region is in electrical communication with the second electrical connector region.

18. A glazing according to claim 17, wherein the first electrode of the first switchable region or the first electrode of the second switchable region has a direct galvanic connection with the first electrical connector region or wherein the first electrode of the first switchable region has a direct galvanic connection with the first electrode of the second switchable region or wherein the second electrode of the first switchable region has a direct galvanic connection with the first electrode of the third switchable region.

19. A glazing according to claim 17, wherein the second electrode of the third switchable region has a direct galvanic connection with the second electrode of the second switchable region.

20. A glazing comprising a first sheet of insulating glazing material spaced apart from a second sheet of insulating glazing material and a switchable device for changing the opacity of at least a portion of a glazing, the switchable device being positioned between the first sheet of insulating glazing material and the second sheet of insulating glazing material, the first sheet of insulating glazing material having a major surface and the switchable device being bonded to the major surface of the first sheet of insulating glazing material by an interlayer structure comprising at least one sheet of adhesive interlayer material, wherein the switchable device comprises at least two (a first and a second) serially electrically connected switchable regions in electrical communication with at least two (a first and a second) electrical connector regions, each switchable region being a respective strip of SPD film (a first strip of SPD film and a second strip of SPD film) having a respective major surface and comprising a respective physically separate electrically actuated variable opacity layer comprising suspended particles between a first electrode and a second electrode, the first switchable region being arranged relative to the second switchable region such that the major surface of each strip of SPD film faces a different portion of the major surface of the first sheet of insulating glazing material, and wherein upon electrical energization of the first and second electrical connector regions, the opacity of the first and second switchable region changes such that at least two (a first and a second) portions of the switchable device have a change of opacity, the first portion of the switchable device having a different opacity to the second portion of the switchable device, wherein the first electrical connector region is in electrical communication with the first electrode of the first switchable region, and the second electrode of the first switchable region is physically separate from and in electrical communication with the first electrode of the second switchable region, and the second electrode of the second switchable region is in electrical communication with the second electrical connector region.

\* \* \* \* \*